(12) United States Patent
Oh et al.

(10) Patent No.: US 11,815,748 B2
(45) Date of Patent: Nov. 14, 2023

(54) OPTOELECTRONIC DEVICE

(71) Applicant: ROCKLEY PHOTONICS LIMITED, Altrincham (GB)

(72) Inventors: James Dongyoon Oh, Alhambra, CA (US); Hooman Abediasl, Thousand Oaks, CA (US); Gerald Cois Byrd, Shadow Hills, CA (US); Karlheinz Muth, Richardson, TX (US); Yi Zhang, Pasadena, CA (US); Aaron John Zilkie, Pasadena, CA (US)

(73) Assignee: Rockley Photonics Limited, Altrincham (GB)

(*) Notice: Subject to any disclaimer, the term of this patent is extended or adjusted under 35 U.S.C. 154(b) by 55 days.

(21) Appl. No.: 17/540,782

(22) Filed: Dec. 2, 2021

(65) Prior Publication Data

US 2022/0163824 A1 May 26, 2022

Related U.S. Application Data

(63) Continuation of application No. 16/281,035, filed on Feb. 20, 2019, now Pat. No. 11,209,678.

(30) Foreign Application Priority Data

Feb. 21, 2018 (GB) ..................................... 1802763

(51) Int. Cl.
*G02F 1/01* (2006.01)
*G02F 1/035* (2006.01)
(Continued)

(52) U.S. Cl.
CPC ............ *G02F 1/025* (2013.01); *G02F 1/0157* (2021.01); *G02F 2201/063* (2013.01); *G02F 2203/21* (2013.01)

(58) Field of Classification Search
CPC .. G02F 1/025; G02F 1/0157; G02F 2201/063; G02F 2203/21; G02F 1/0147; G02F 1/015
(Continued)

(56) References Cited

U.S. PATENT DOCUMENTS 6,278,168 B1 8/2001 Day
6,849,914 B2 2/2005 Day
(Continued)

FOREIGN PATENT DOCUMENTS

GB 2 339 919 A 2/2000
GB 2554460 A 4/2018
(Continued)

OTHER PUBLICATIONS

U.K. Intellectual Property Office Examination Report, dated Feb. 2, 2022, for Patent Application No. GB2107324.2, 5 pages.
(Continued)

*Primary Examiner* — Kaveh C Kianni
*Assistant Examiner* — Hung Q Lam
(74) *Attorney, Agent, or Firm* — Lewis Roca Rothgerber Christie LLP

(57) ABSTRACT

An optoelectronic device, including: a rib waveguide, the rib waveguide including: a ridge portion, which includes a temperature-sensitive optically active region, and a slab portion, positioned adjacent to the ridge portion; the device further comprising a heater, disposed on top of the slab portion wherein a part of the heater closest to ridge portion is at least 2 μm away from the ridge portion. The device may also have a heater provided with a bottom cladding layer, and may also include various thermal insulation enhancing cavities.

21 Claims, 21 Drawing Sheets

(51) Int. Cl.
*G02F 1/295* (2006.01)
*G02B 6/10* (2006.01)
*G02F 1/025* (2006.01)
*G02F 1/015* (2006.01)

(58) Field of Classification Search
USPC .............................. 385/1–4, 8, 14, 129–132
See application file for complete search history.

(56) References Cited

U.S. PATENT DOCUMENTS

| | | |
|---|---|---|
| 7,509,005 B2 | 3/2009 | Sandhu et al. |
| 7,693,354 B2 | 4/2010 | Carothers |
| 7,706,647 B2 | 4/2010 | Sandhu et al. |
| 8,150,223 B2 | 4/2012 | Li et al. |
| 9,588,360 B2 | 3/2017 | Feng et al. |
| 9,684,191 B2 | 6/2017 | Gill et al. |
| 9,778,494 B1 | 10/2017 | Feng et al. |
| 10,571,723 B2 | 2/2020 | Guzzon et al. |
| 2003/0057428 A1 | 3/2003 | Day |
| 2004/0258344 A1 | 12/2004 | Fardi et al. |
| 2006/0098911 A1 | 5/2006 | Sandhu et al. |
| 2006/0228084 A1 | 10/2006 | Sandhu et al. |
| 2008/0181550 A1 | 7/2008 | Earnshaw |
| 2009/0110342 A1 | 4/2009 | Webster et al. |
| 2009/0297092 A1 | 12/2009 | Takahashi |
| 2010/0054653 A1 | 3/2010 | Carothers |
| 2010/0247029 A1 | 9/2010 | Li et al. |
| 2011/0280512 A1 | 11/2011 | Abe et al. |
| 2012/0087613 A1 | 4/2012 | Rasras |
| 2014/0010248 A1 | 1/2014 | Larson |
| 2014/0321488 A1 | 10/2014 | Chen et al. |
| 2016/0170239 A1 | 6/2016 | Feng et al. |
| 2017/0131576 A1 | 5/2017 | Gill et al. |
| 2017/0269391 A1 | 9/2017 | Feng et al. |
| 2018/0100966 A1* | 4/2018 | Meister .............. G02B 6/29398 |

FOREIGN PATENT DOCUMENTS

| | | |
|---|---|---|
| WO | WO 02/31555 A2 | 4/2002 |
| WO | WO 02/44777 A1 | 6/2002 |
| WO | WO 2009/032820 A1 | 3/2009 |
| WO | WO 2016/165708 A1 | 10/2016 |

OTHER PUBLICATIONS

U.K. Intellectual Property Office Search and Examination Report, dated Aug. 13, 2018, for Patent Application No. GB1802763.1, 9 pages.
U.K. Intellectual Property Office Search and Examination Report, dated Aug. 6, 2021, for Patent Application No. GB2107324.2, 5 pages.
U.S. Office Action from U.S. Appl. No. 16/281,035, dated Aug. 21, 2020, 8 pages.
U.S. Office Action from U.S. Appl. No. 16/281,035, dated Apr. 2, 2021, 7 pages.

\* cited by examiner

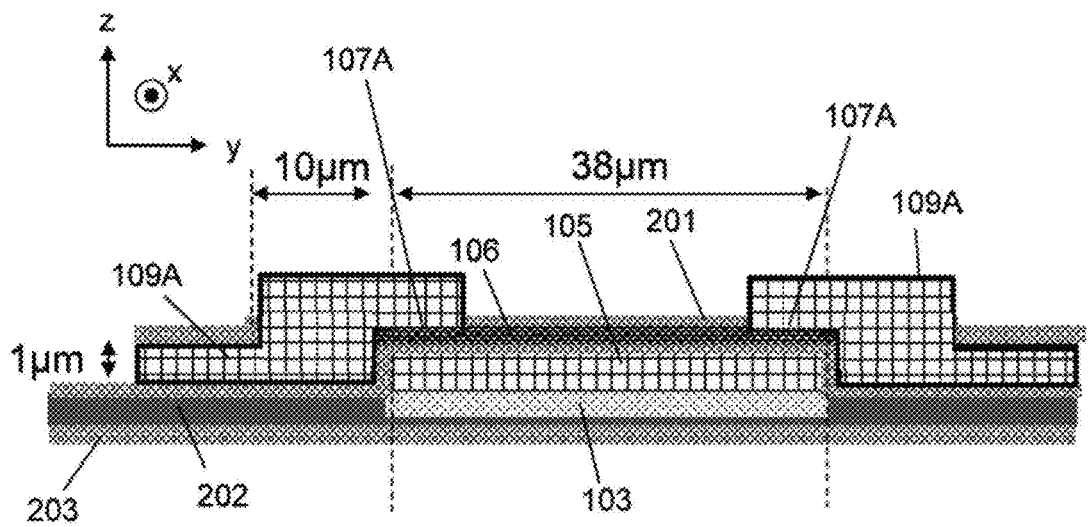
Fig. 2A(ii)
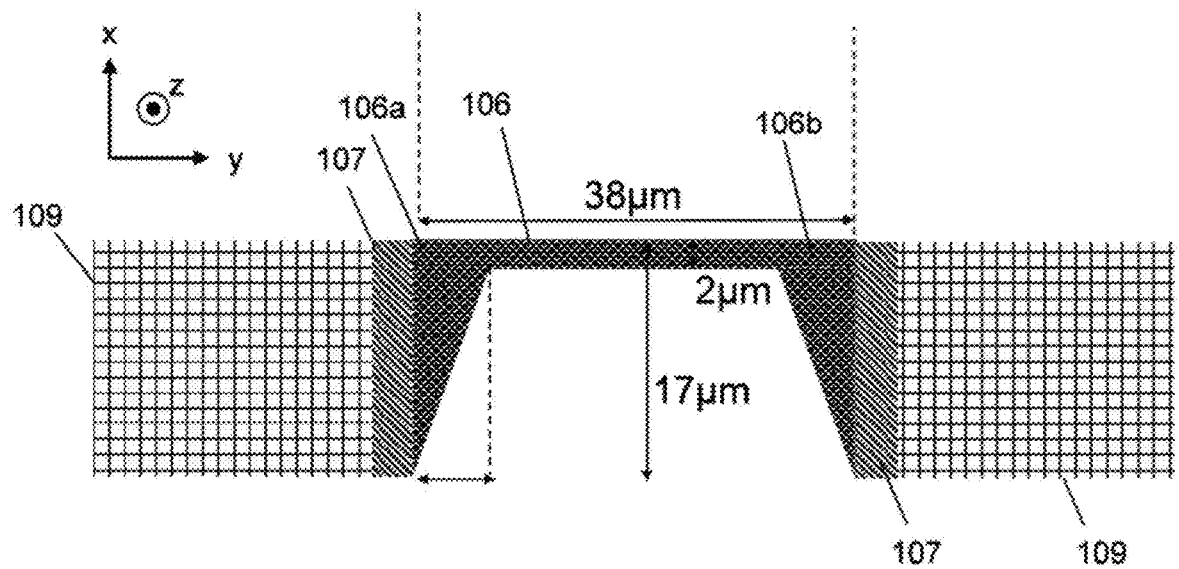
Fig. 2B(ii)

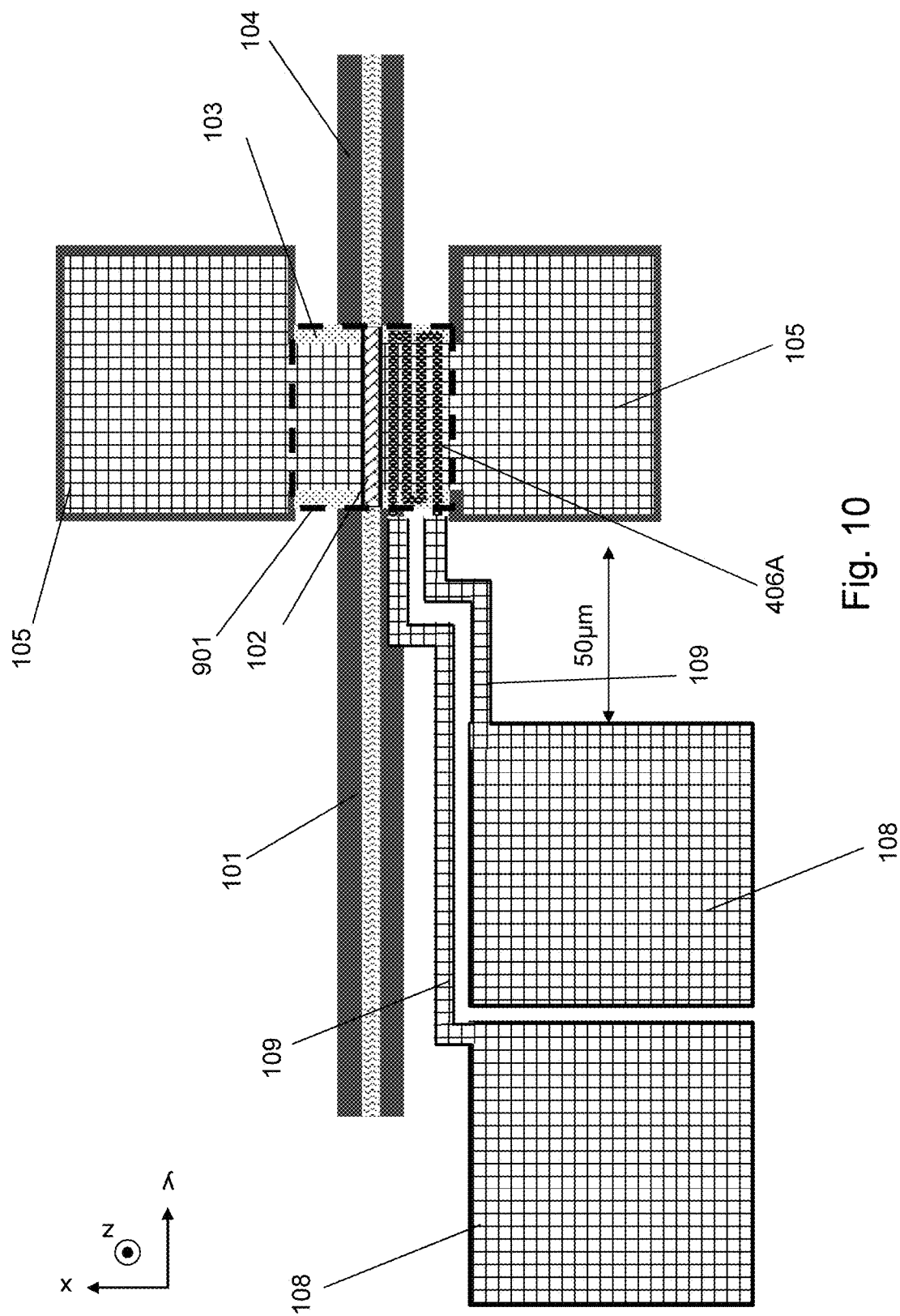

OPTOELECTRONIC DEVICE

CROSS-REFERENCE TO RELATED APPLICATION(S)

The present application is a continuation of U.S. patent application Ser. No. 16/281,035, filed Feb. 20, 2019, entitled "OPTOELECTRONIC DEVICE", which claims priority to United Kingdom Patent Application No. GB 1802763.1, filed Feb. 21, 2018, entitled "OPTOELECTRONIC DEVICE"; the entire contents of all of the documents identified in this paragraph are incorporated herein by reference.

FIELD

The present invention relates to heaters in optoelectronics, and particularly to heaters in electro-absorption modulators.

BACKGROUND

Optoelectronic devices, and particularly electro-absorption modulators (EAMs) can be temperature sensitive. For example, the working wavelength of an EAM may vary considerably when the temperature of the device varies. The physical mechanism underlying this is that the band-edge wavelength of the material forming the EAM can have a temperature dependence.

This temperature dependence can be beneficial, for example when operating in a coarse wavelength division multiplex (CWDM) mode. However in such operational modes the temperature of the device must be accurately controlled.

In conventional devices, a heater is placed immediately adjacent to or on top of (relative to the substrate) the EAM. In such devices a severe temperature gradient can form across the EAM, which may significantly degrade the performance of the EAM.

SUMMARY

Generally the disclosure relates to the provision of heaters in an optoelectronic device in a manner providing more uniform heating, and to the thermal isolation thereof so as to increase efficiently. In one aspect, some embodiments of the invention relate to providing cavities or trenches so as to thermally isolate the heater and optically active region.

In a first aspect, some embodiments of the invention provide an optoelectronic device, including:
 a rib waveguide, the rib waveguide including:
  a ridge portion, which includes a temperature-sensitive optically active region,
  and a slab portion, positioned adjacent to the ridge portion;
 the device further comprising a heater, disposed on top of the slab portion wherein a part of the heater closest to ridge portion is at least 2 µm away from the ridge portion.

By placing the heater at least 2 µm away from the ridge portion, a far more uniform temperature can be established within the ridge portion of the waveguide which contains the temperature-sensitive optically active region. In some examples, the part of the heater closest to the ridge portion is at least 3 µm away from the ridge portion.

In a second aspect, some embodiments of the invention provide an optoelectronic device, including:
 a rib waveguide, the rib waveguide including:
  a ridge portion, which includes a temperature-sensitive optically active region,
  and a slab portion, positioned adjacent to the ridge portion;
 the device further comprising a heater, disposed in an epitaxial crystalline cladding layer which is located beneath the slab portion.

By providing the heater within an epitaxial crystalline cladding layer, better temperature uniformity can be obtained. Moreover the increase in the footprint of the device can be minimized whilst providing a heater. The heater also does not use the exposed surface area of the device, and may not suffer from electromigration or self-Joule heating (which are both failure mechanisms in heaters).

The heaters of the first and second aspects can allow an electro-absorption modulator included in the rib waveguide to operate across a range of wavelengths. For example, when the optically active region provides an electro-absorption modulator, the device may be operable from a wavelength of at least 1450 nm to no more than 1610 nm, and, in some embodiments, at least 1550 nm to no more than 1610 nm. This may allow the use of a coarse wavelength division multiplexing scheme. The optically active region may be formed of $Si_xGe_{1-x}$ where $0.005 \leq x \leq 0.01$ and, in some embodiments, where $0.005 < x < 0.01$.

In a third aspect, some embodiments of the invention provide an optoelectronic device, including:
 a rib waveguide, the rib waveguide including:
  a ridge portion, which includes a temperature-sensitive optically active region,
  and a slab portion, positioned adjacent to the ridge portion;
 the device further comprising:
  a heater, for heating the temperature-sensitive optically active region;
  a bottom cladding layer, disposed adjacent to the slab portion;
  and a thermal isolation trench, wherein the thermal isolation trench is positioned adjacent to the bottom cladding layer.

The thermal isolation trench operates to thermally isolate the heater and optically active region from the remainder of the device, and so can increase the efficiency of the heater. As a result, less energy may be required to maintain the optically active region at a desired temperature.

In a fourth aspect, some embodiments of the invention provide an optoelectronic device, including:
 a rib waveguide, the rib waveguide including:
  a ridge portion, which includes a temperature-sensitive optically active region,
  and a slab portion, positioned adjacent to the ridge portion;
 wherein the device further comprises:
  a heater, for heating the temperature-sensitive optically active region;
  a bottom cladding layer, disposed adjacent to the slab portion; and
  a thermal isolation cavity, located on an opposing side of the bottom cladding layer to the slab portion.

The thermal isolation cavity operates to thermally isolate the heater and optically active region from the remainder of the device, and so can increase the efficiency of the heater. As a result, less energy may be required to maintain the optically active region at a desired temperature.

In a fifth aspect, some embodiments of the invention provide an optoelectronic device, including:

a rib waveguide, the rib waveguide including:
   a ridge portion, which includes a temperature-sensitive optically active region,
   and a slab portion, positioned adjacent to the ridge portion;
wherein the device further comprises:
a heater, for heating the temperature-sensitive optically active region; and
an electrode, electrically connected to the either the ridge portion or the slab portion, and a heater positioned between the electrode and the ridge portion;
wherein the electrode includes at least one thermal isolation cavity.

The or each thermal isolation cavity in the electrode operates to thermally isolate the heater and optically active region from the remainder of the device, and so can increase the efficiency of the heater. As a result, less energy may be required to maintain the optically active region at a desired temperature.

By rib waveguide, it may be meant that the waveguide acts to confine an optical mode of the waveguide within the ridge portion of the waveguide. Alternatively, the device may be a ridge waveguide by which it may be meant that the optical mode of the waveguide is confined within the slab portion of the waveguide and the ridge portion may act to guide light passing through the waveguide. As a further alternative, it may be meant that the optical mode is confined to both the ridge portion and the slab portion. In all aspects discussed above, the bottom cladding layer may be an epitaxial crystalline cladding layer. By adjacent, it may be meant that the slab portion of the waveguide is immediately adjacent to the ridge portion. The entire rib waveguide may be considered as forming an inverted 'T' shape, where the leg of the T is provided by the ridge portion and the bar of the T is provided by the slab portion. The slab portion may be adjacent to the ridge portion in a direction perpendicular to the guiding direction of the waveguide. The ridge portion may be considered to be the portion of the waveguide which extends from the slab portion in a direction away from a silicon substrate. The slab portion may also include the portion of the waveguide directly beneath (relative to an upper surface of the device) the ridge portion. Alternatively, the slab portion can be considered to have two sub-portions, either side of the ridge portion such that the ridge portion bisects the overall slab portion.

Optional features of some embodiments of the invention will now be set out. These are applicable singly or in any combination with any aspect of embodiments of the invention.

A width of a first region of the heater may taper from a first width to a second width in a direction parallel or substantially parallel to a guiding direction of the rib waveguide. The width of a second region of the heater increases from the second width to the first width along the direction parallel or substantially parallel to the guiding direction of the rib waveguide. The tapering region may be used to decrease the junction current density below a threshold, and so help in avoiding electromigration (a cause of failure in some heaters).

The heater may be formed from any one of: Ti, TiN, TiW, NiCr, or W, and may, in some embodiments, be formed of either Ti or TiN.

The heater may comprise plural metal strips, connected at one end to an adjacent metal strip so as to form a serpentine form. By doing so, the electrical length of the heater can be increased whilst not increasing the footprint of the heater in the device. This increase in electrical length can increase the electrical resistivity of the heater, which can reduce the current density in the waveguide. If the serpentine heater is powered by a constant current source, it may display an increase in generated heat as compared to a non-serpentine heater. The heater may comprise at least 2 metal strips and no more than 9 metal strips, and, in some embodiments, at least 2 and no more than 5 metal strips. The heater may include a first and second electrode for the heater, which are electrically connected to the heater on the same side. By same side, it may be meant that the heater can be generally rectangular, and that the electrodes may electrically connect to the heater on a same side of the rectangle. Each metal strip may have a width of at least 0.5 µm and no more than 15 µm, and, in some embodiments, may have a width of at least 2.0 µm and no more than 4.0 µm. A gap between adjacent metal strips may have a width of at least 0.5 µm and no more than 10 µm, and, in some embodiments, may have a width of at least 1.0 µm and no more than 2.0 µm.

The heater may be disposed above an electrical contact for the slab portion and separated therefrom by an insulator. By doing so, the overall footprint of the device may be maintained whilst ensuring that the heater does not electrically interfere with the slab portion.

The device may include a second heater, identical or substantially identical to the first and disposed on an opposing side of the ridge portion. By opposing side, it may be meant that the slab portion has two regions one on a first side of the ridge portion and one on a second side of the ridge portion. The opposing side may be the second side, and the first heater may be disposed on the first side. By identical, it may mean that the second heater is structurally identical to the first but mirrored in a plane aligned with the ridge portion.

The heater may comprise a doped region of the epitaxial crystalline cladding layer, or a doped region of a silicon-on-insulator layer disposed beneath the slab portion of the waveguide. The epitaxial crystalline cladding layer may be formed of silicon. The doped region of the epitaxial crystalline cladding layer may extend in a direction parallel or substantially parallel to the guiding direction of the rib waveguide. The doped region may have a width of at least 1 µm and no more than 30 µm, and, in some embodiments, has a width of at least 3 µm and no more than 20 µm. The doped region may have a height of at least 0.1 µm and no more than 0.3 µm, and, in some embodiments, has a height of at least 0.15 µm and no more than 0.2 µm. The doped region may have a doping concentration of at least $1 \times 10^{20}$ cm$^{-3}$ and no more than $2.5 \times 10^{20}$ cm$^{-3}$. The device may further include an undoped region of the epitaxial crystalline cladding layer, the undoped region being located between the doped region and the slab portion.

The thermal isolation trench may be filled with either air or silicon dioxide, and is, in some embodiments, filled with air. The thermal isolation trench may have a width of at least 0.5 µm and no more than 2.0 µm. The device may include plural thermal isolation trenches, which are arranged around a periphery of the slab portion. By periphery, it may be meant that the thermal isolation trenches are disposed around an outermost edge of the slab portion. The outermost edge may be the one furthest from the ridge portion, as measured in the plane of the device. For example, the slab portion may be generally rectangular, and so the thermal isolation trenches would be disposed along the edges of the rectangle.

The device may further include a buried oxide layer, disposed adjacent to a lower surface of the bottom cladding layer, wherein the thermal isolation cavity is located on an opposing side of the buried oxide layer and is adjacent to a silicon substrate. The thermal isolation cavity may have a width which is larger than a width of the slab portion. Between the bottom cladding layer and the slab portion there may be a crystalline rare earth oxide (CREO) or rare earth oxide (REO) layer. This CREO or REO layer, and the bottom cladding layer, may have a crystalline orientation of (111).

The electrode for the modulator may comprise plural thermal isolation cavities in an array, wherein the array extends in a direction parallel or substantially parallel to the guiding direction of the rib waveguide. The array may extend for a length of at least 50 μm and no more than 100 μm and, in some embodiments, for a length of at least 50 μm and no more than 70 μm. The electrode may comprise at least 2 cavities and no more than 30 cavities, and, in some embodiments, comprises at least 5 and no more than 10 cavities. The or each cavity in the electrode may have a length of at least 2 μm and no more than 30 μm, and, in some embodiments, has a length of at least 5 μm and no more than 10 μm. The or each cavity in the electrode may have a width of at least 1 μm and no more than 10 μm, and, in some embodiments, at least 3 μm and no more than 5 μm. A gap between adjacent cavities in the electrode may have a length of at least 1 μm and no more than 20 μm, and, in some embodiments, a length of at least 1 μm and no more than 3 μm. The or each cavity in the electrode may be filled with air or $SiO_2$.

BRIEF DESCRIPTION OF THE DRAWINGS

Embodiments of the invention will now be described by way of example with reference to the accompanying drawings in which:

FIG. 2A(ii) shows a variant cross-sectional view of the device in FIG. 1 along the line A-A';

FIG. 2B(ii) shows a variant top-down view of a heater for an optoelectronic device;

FIG. 10 shows a top-down view of a variant optoelectronic device;

DETAILED DESCRIPTION AND FURTHER OPTIONAL FEATURES

Figure 1:
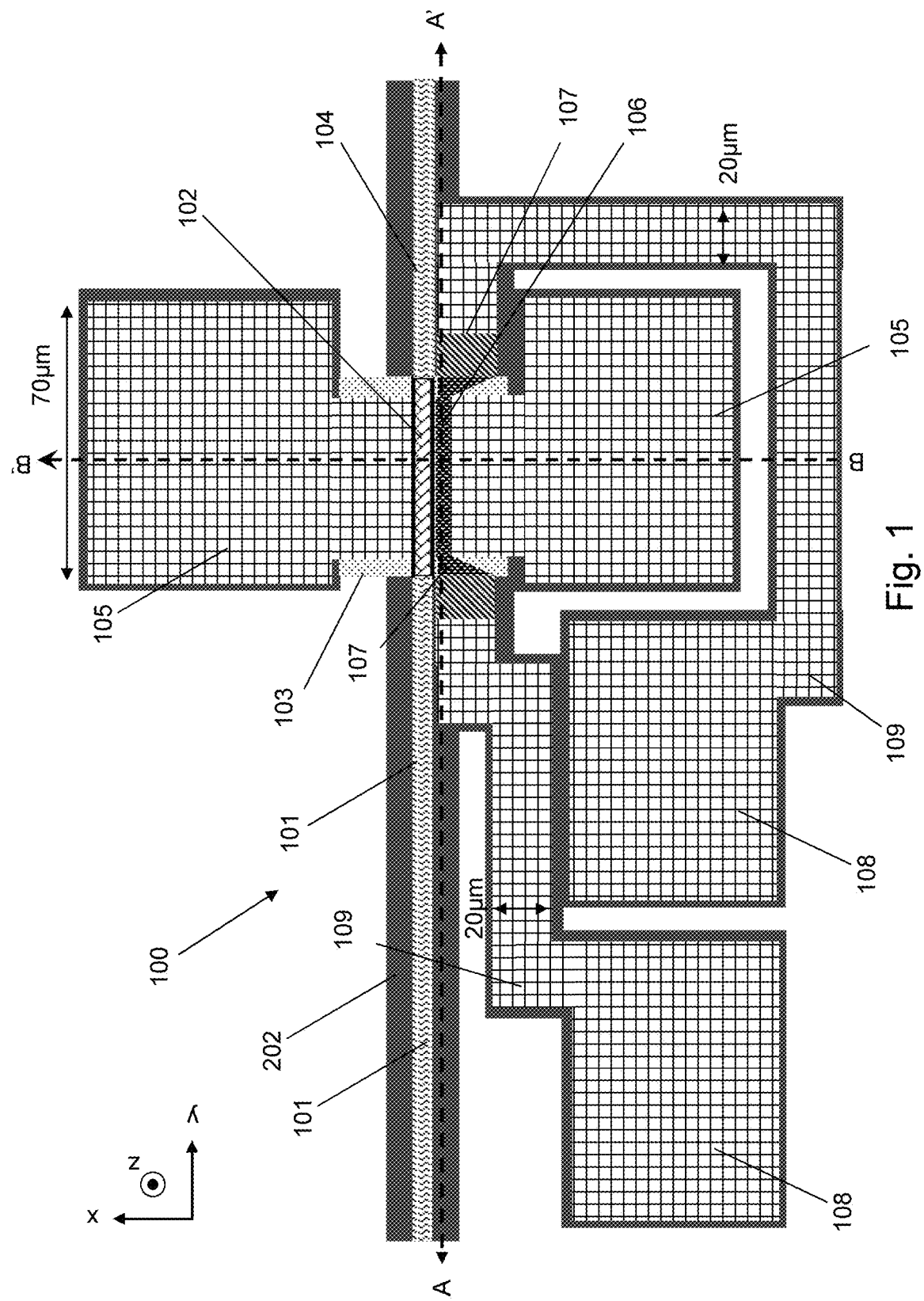
FIG. 1 shows a top-down view of an optoelectronic device.

FIG. 1 shows a top-down review of an optoelectronic device 100. An input waveguide 101 guides light into a rib waveguide which comprises a ridge portion 102 and a slab portion 103 atop of a silicon-on-insulator layer 202. The ridge portion may, for example, include or provide an electro-absorption modulator (EAM) or photodiode structure. Depending on the nature of the ridge portion of the rib waveguide, light may exit the device through output waveguide 104. Connected to the rib and slab portions are electrical pads 105 which may be formed of titanium or aluminium. Generally the electrodes are formed of 1 μm thick aluminium, and may contain a 10 nm thick titanium layer between the aluminium and the slab as an electrical barrier. Disposed on top of a part of the slab portion 103, is a heater 106. The heater is formed of a generally elongate metal strip, located no closer than 2 μm to the ridge portion 102 of the rib waveguide. The heater is connected to junctions 107 at either end, which respectively connect ends of the heater 106 to metal traces 109. The metal traces 109 then connect to the electrical pads 108 for the heater. In this example, the electrical pads are formed of aluminium and the heater is formed of Ti or TiN. The metal traces may also be formed of aluminium, and would generally introduce a resistance of less than 1Ω, for example around 0.6Ω. A total length of each metal trace may be around 400 μm, a width of each metal traces may be around 20 μm and the metal traces may have a height of around 1 μm. The dimensions of some parts of the optoelectronic device are indicated in the figure.

A change of 35° C. within the rib waveguide may cause a wavelength shift of around 27 nm or 30 nm. This change in average temperature within the rib waveguide may be referred to as ΔT. A heater which is an embodiment of the present invention had the following properties:

| w | t | Efficiency | R | I | $V_{in}$ | Power | $T_{heater}$ |
|---|---|---|---|---|---|---|---|
| 2 μm | 100 nm | 0.37° C./mW | 80 Ω | 34 mA | 2.7 V | 94 mW | 385° C. | where w is the width of the heater. R is the electrical resistance; I is the current, J is the current density, $V_{in}$ is the input voltage, and $T_{heater}$ is the temperature, all as measured within the heater when ΔT=35° C. The heater thickness, t, may be at least 30 nm and no more than 500 nm and, in some embodiments, at least 50 nm and no more than 200 nm. The values in this table are for an example where there is no buried oxide layer beneath the slab.

It is worth discussing at this stage, the principal directions associated with the device 100. As indicated by y, one principal direction is generally aligned with a guiding direction of the input and output waveguides 101 and 104. At 90 degrees to this, but still within the plane of the device is principal direction x. And at 90 degrees to both directions y and x is direction z extending out of the plane of the device.

Figure 2A:
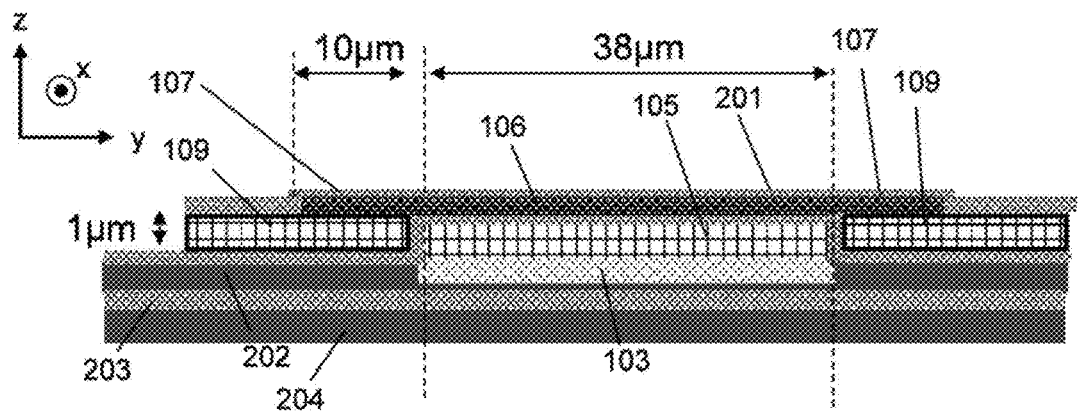
FIG. 2A(i) shows a cross-sectional view of the device in FIG. 1 along the line A-A'.

As shown in FIG. 2A(i), which is a cross-section of the device shown in FIG. 1 along the line A-A', heater 106 extends across a width of the electrical pad 105 for the waveguide and a part of the slab portion 103 to connect at respective ends to the metal traces 109. The electrical pad 105 may be electrically connected to the slab portion 103 which may be doped, for example n++ doped. The electrical pad in this example is around 1 μm tall, i.e. as measured in the z direction. As can be seen in this cross-section, the device further comprises a buried oxide (BOX) layer 203 (which may be 400 nm thick) which is above a silicon substrate 204, as well as a silicon-on-insulator layer 202 (which may be 400 nm thick) which is above the buried oxide layer. Generally these devices are covered by upper cladding layer 201, which may be formed of silicon dioxide ($SiO_2$) and may be 500 nm thick. The upper cladding layer may be around 0.5 μm thick. This upper cladding layer can be used for passivation i.e. to prevent oxidation. As can be seen, a central portion of the heater extends along direction y for approximately 38 μm with the respective connectors adding around 10 μm of length to the heater. Below the silicon substrate 204 may be a further buried oxide layer, and below the further buried oxide layer there may be a further silicon substrate i.e. the entire device is provided on a DSOI (double silicon-on-insulator) wafer.

Figure 2B:
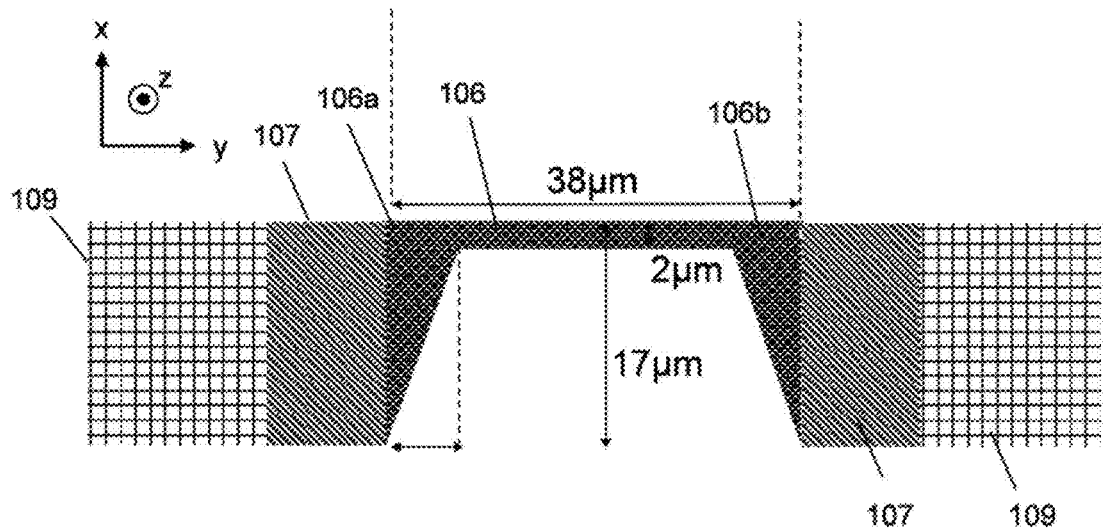
FIG. 2B(i) shows a top-down view of a heater for an optoelectronic device.
Figure 2C:
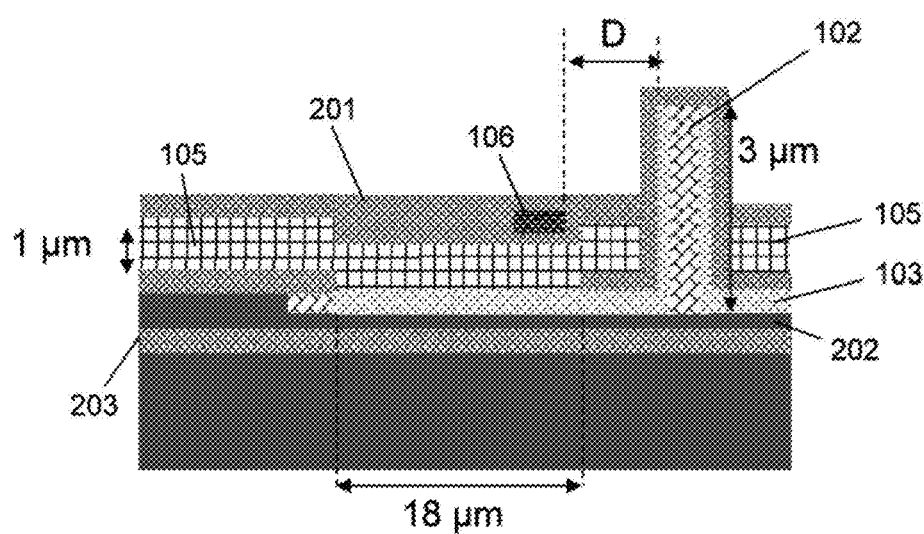
FIG. 2C shows a cross-sectional view of the device in FIG. 1 along the line B-B'.

FIG. 2B(i) is a partial top-down view of the heater 106. As can be seen in region 106a of the heater, a width of the heater as measured in direction x tapers from around 17 μm to 2 μm in a direction parallel to the guiding direction (i.e. direction y) the width of the heater then increases from 2 μm to around 17 μm in region 106b. These tapered regions 106a and 106b allow the heater to connect to the metal traces 109 whilst ensuring that the current density is not too high in any given region. FIG. 2C shows a cross-sectional view of the device in FIG. 1 along the line B-B'. As can be seen, the electrode 105 for the waveguide are disposed underneath the heater 106, and electrically connect to doped regions of the slab 103. In some examples, the buried oxide layer 203 below the slab 103 may be etched away and replaced with an epitaxial crystalline semiconductor e.g. Si or SiGe.

FIGS. 2A(ii) and 2B(ii) show a variation of the device shown in FIGS. 2A(i) and 2B(i), and so like features are indicated by like reference numerals. A difference between the two devices is that the aluminium trace 109A for the heater includes a portion which extends away from the silicon-on-insulator layer 202 and then over an upper surface of the heater 106. The junction 107A and electrical connection from the trace 109 to the heater 106 is therefore made on an upper surface of the heater. Whereas in FIGS. 2A(i) and 2B(i), the electrical connection is between a lower surface of the heater and the trace. The electrical junction 107A described in relation to FIGS. 2A(ii) and 2B(ii) may be more reliable than the equivalent disclosed in FIGS. 2A(i) and 2B(i).

Figure 3:
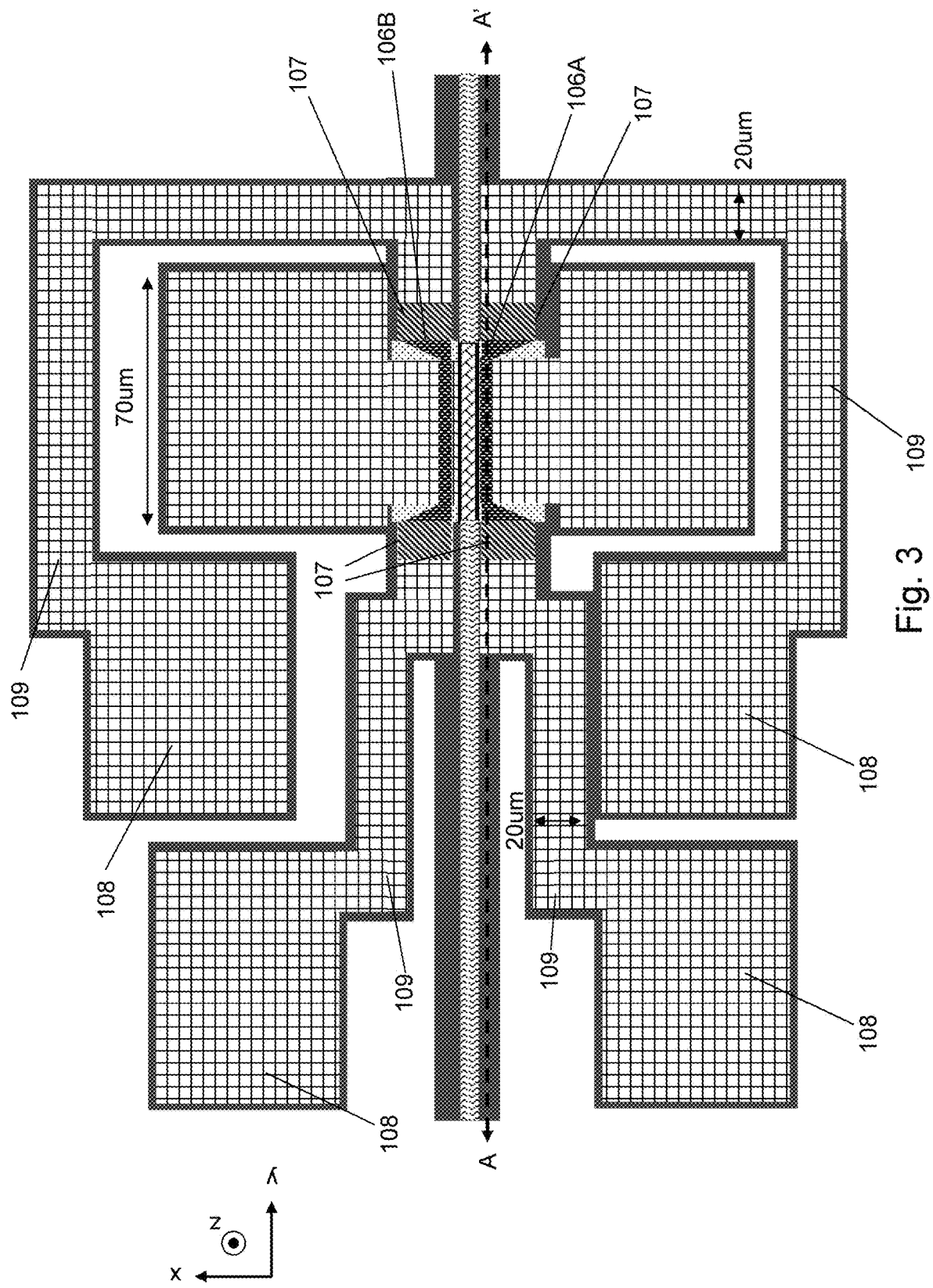
FIG. 3 shows a top-down view of a variant optoelectronic device.

A variant optoelectronic device shown in FIG. 3, where two identical heaters 106A and 106B are disposed on either side of the rib waveguide. The heaters are identical except that they are mirrored in a plane aligned with the ridge portion of the waveguide. The table below gives an indication of the difference two heaters (as shown in FIG. 3) makes as compared to a single heater

TABLE 1

| Under-cut | Trench | N ° heaters | Efficiency (° C./mW) | R (Ω) | I (mA) | $V_{in}$ (V) | Power (mW) | $T_{heater}$ (° C.) |
|---|---|---|---|---|---|---|---|---|
| N | N | 1 | 0.37 | 80 | 34 | 2.7 | 94 | 385 |
| N | N | 2 | 0.37 | 80 | 24 | 1.9 | 94 | 220 |
| Y | Y | 1 | 1.02 | 80 | 21 | 1.6 | 34 | 180 |
| Y | Y | 2 | 1.02 | 80 | 15 | 1.2 | 34 | 119 |

Where the heater had a thickness, t, of 100 nm (measured in the z direction) and a narrowest width, w, of 2 μm (measured in the x direction). In the table, R is the electrical resistance of the heater, I is the input current, V is the input voltage, and $T_{heater}$ is the temperature of the heater. The values for I, $V_{in}$, Power, and $T_{heater}$ are for when ΔT, the change in average temperature of the waveguide, is 35° C. The values in Table 1 are for examples where a buried oxide layer located beneath the silicon substrate 204 has a thickness of around 0.4 μm, and where the buried oxide layer 203 located between the silicon substrate and the slab 103 has been replaced with silicon. Of note, is that by including a second heater the temperature increase within each heater is around half that of the single heater embodiment. Also, the input voltage required to both heaters in the two heater embodiment is around 70% of the voltage required in the single heater embodiment. The parameters 'under-cut' and 'trench' indicate the presence of a cavity or thermal isolation trench as discussed below.

Figure 4A:
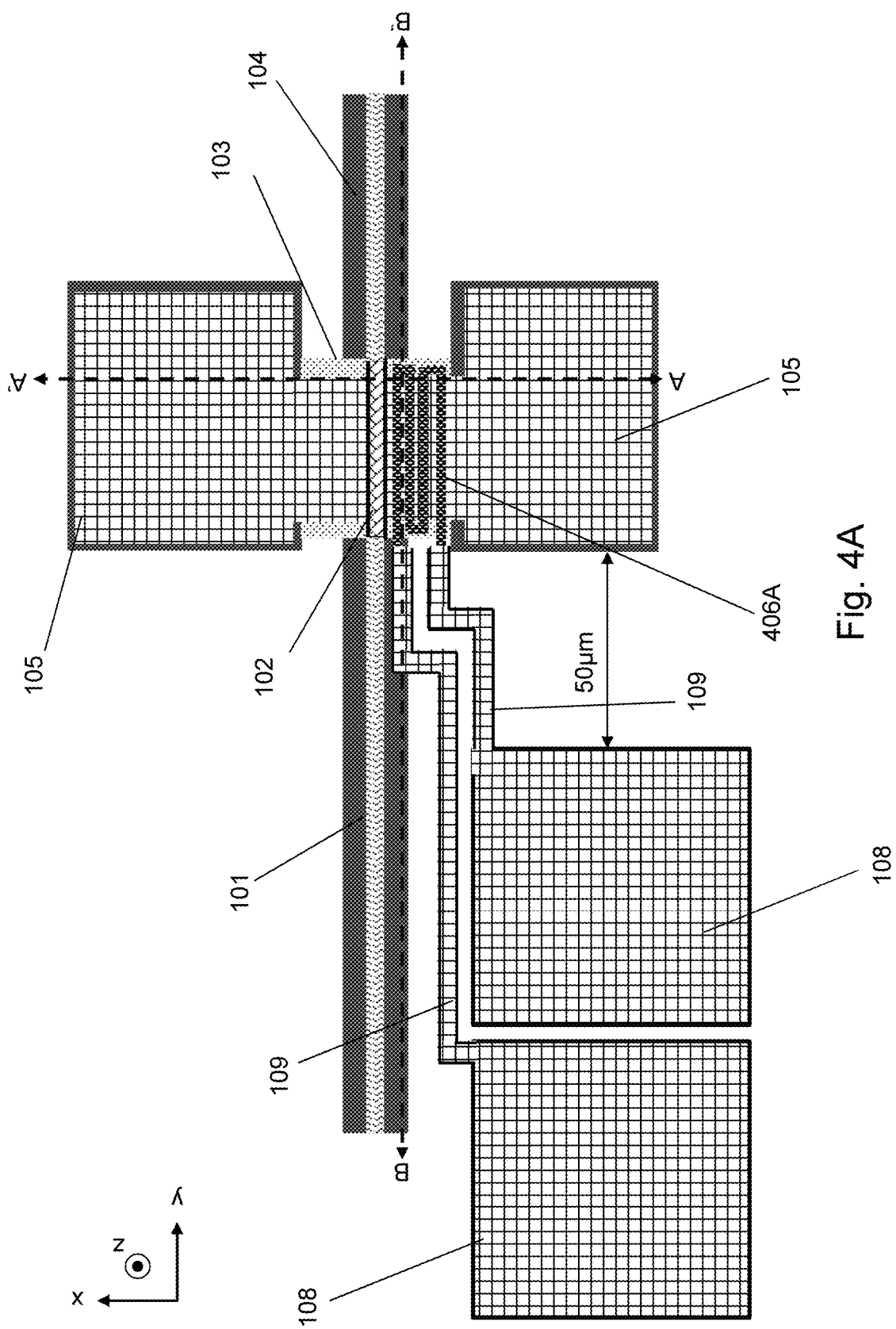
FIG. 4A shows a top-down view of a variant optoelectronic device.
Figure 4B:
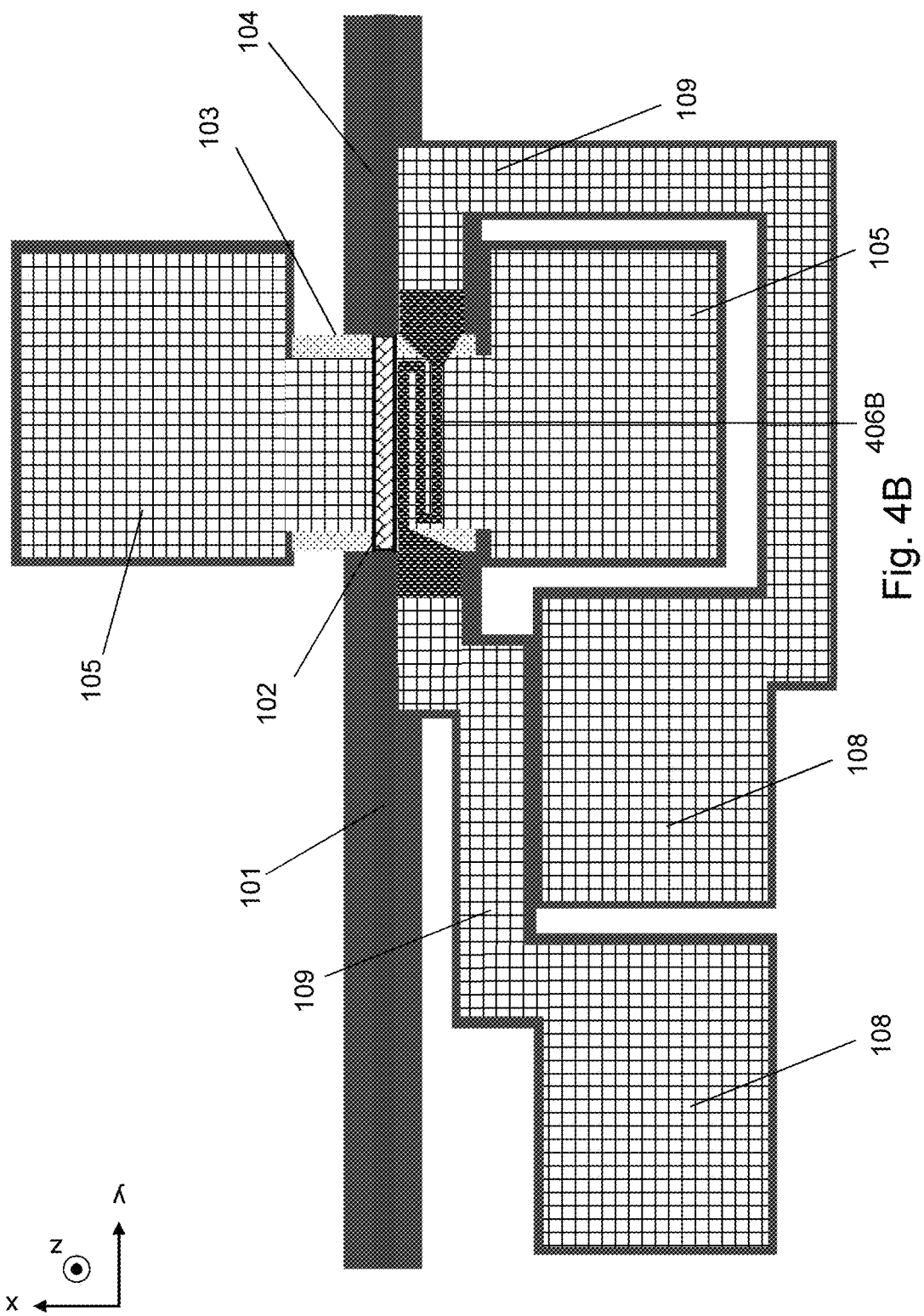
FIG. 4B shows a top-down view of a variant optoelectronic device.

FIG. 4A shows a variant optoelectronic device, where like features are indicated by like reference numerals. A difference between this optoelectronic device and that shown in FIG. 1 is that the heater 406A comprises plural metal strips which extend in direction y and are connected at one end to an adjacent metal strip. In this example, the heater 406A is formed of four metal strips and forms a generally serpentine shape. By doing so, the electrical length of the heater can be increased and therefore the available heat output will similarly increase. This increase in electrical length can increase the electrical resistivity of the heater, which can reduce the current density in the waveguide. If the serpentine heater is powered by a constant current source, it may display an increase in generated heat as compared to a non-serpentine heater. As with heater 106 in FIG. 1, no part of heater 406A is closer than 2 μm to the ridge portion of the waveguide 102. Also shown in this figure is that the electrical traces 109 both contact the heater 406A on a same side of the heater e.g. the side closest to the input waveguide 101. This can serve to further reduce the footprint for the device including the heater. FIG. 4B shows a variation of the device shown in FIG. 4A. In this figure, the heater 406B comprises an odd number of metal strips, and therefore metal traces 109 connect to the heater at opposing ends relative to the input waveguide 102.

Generally, the process for flow providing such devices comprises the steps of: (i) depositing the electrical pad and metal traces for the heater at the same time as depositing the electrical pad for the waveguide; (ii) depositing the upper cladding layer and etching vias for connection to the electrical pad and metal traces for the heater; (iii) depositing an at least 50 nm and no more than 200 nm thick heater layer, for example a 100 nm thick heater layer, and patterning said layer; and (iv) depositing an oxide of around 0.5 µm in thickness for passivating the heater layer. The heater may be provided by depositing titanium.

Figure 5A:
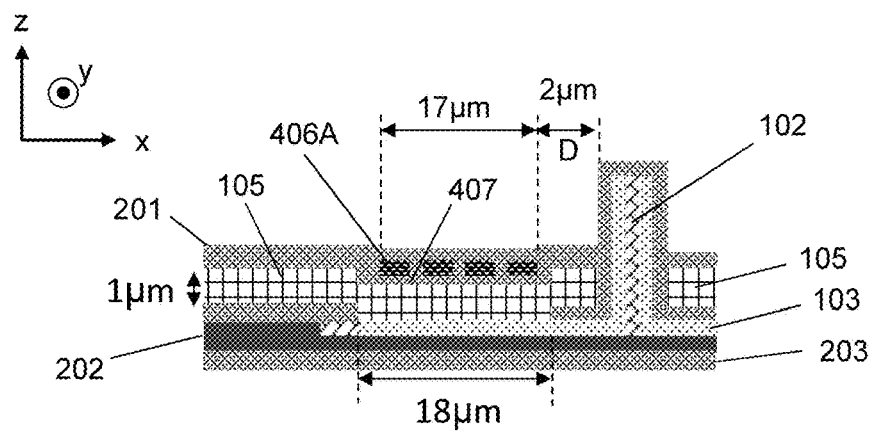
FIG. 5A shows a cross-sectional view of the device in FIG. 4A along the line A-A.

FIG. 5A is a cross sectional view of the device shown in FIG. 4A along the line A-A'. It is similar to the cross section shown in FIG. 2A(i) and so like features are indicated by like reference numerals. Notable changes include that the heater now comprises plural metal strips which have a total width as measured in the x direction of around 17 µm. This width is one example, however many other total widths can be used. Generally, the width can be calculated as $w_{total}=n \times w_{strip}+(n-1) \times g$, where n is the number of strips, w strip is the width of a single strip, and g is the width of the gap between adjacent strips. Also of note, but which was also present in FIG. 2A(i), is an insulating layer 407 which serves to electrically isolate the heater 406 from the electrical pad 105 of the waveguide. A via exists in the upper cladding layer 201 so that the electrode 105 for the waveguide can electrically contact the slab region. This via has a width of around 18 µm and a length of around 38 µm.

Figure 5B:
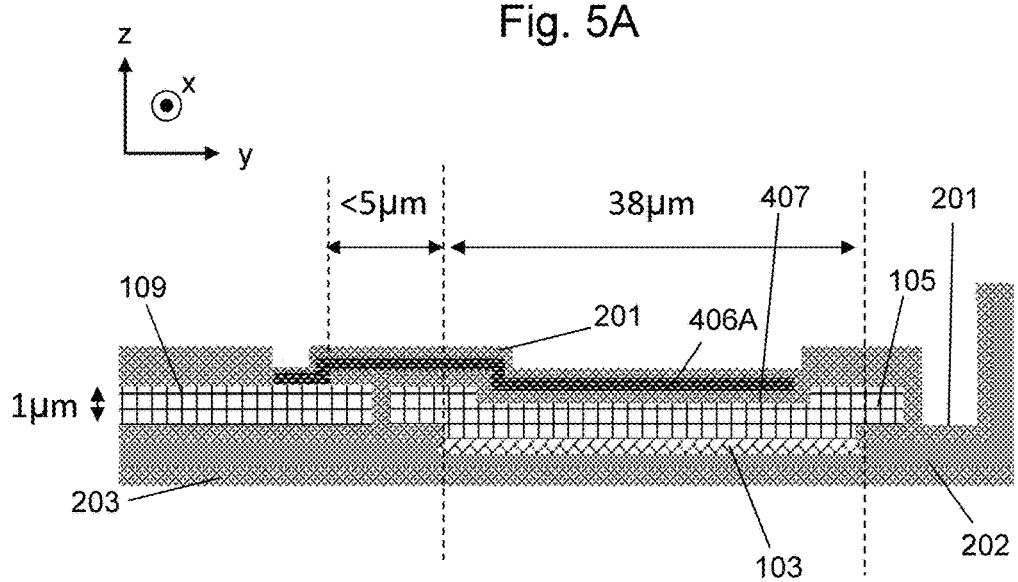
FIG. 5B shows a cross-sectional view of the device in FIG. 4A along the line B-B'.
Figure 5C:
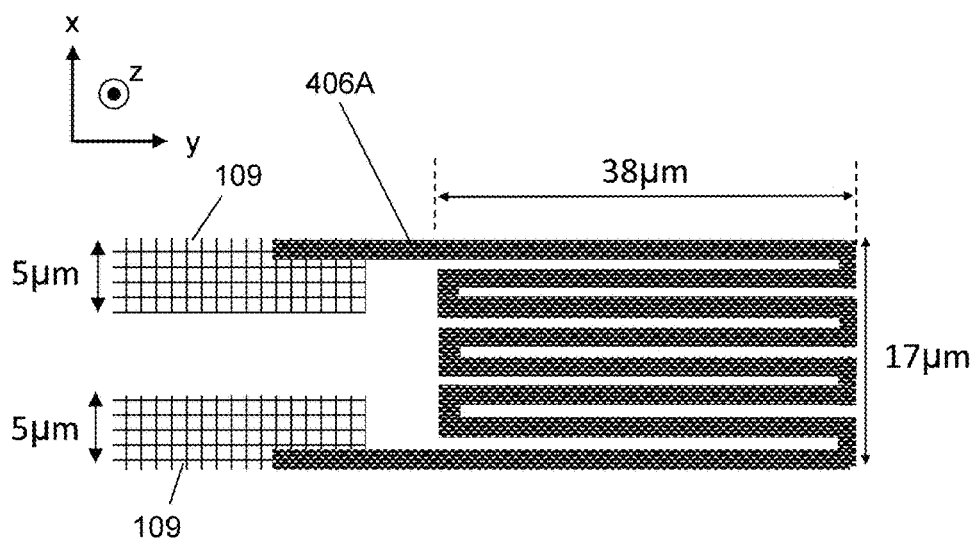
FIG. 5C shows a top-down view of a variant heater for an optoelectronic device.

FIG. 5B is a cross-sectional view of the device shown in FIG. 4A along the line B-B'. Here the extension of the heater 406 can be more easily seen. The connection from metal trace 109 to the heater 406 is over a distance of no more than 5 µm. In this example, the material comprising the heater extends away from the core region of the heater and contacts the metal trace 109 through a separate via in the upper cladding layer 201. FIG. 5C is a partial top-down view of the heater 406 as included in the device shown in FIG. 4A. As can be seen, the core region of the heater is defined by a rectangular region of width 17 µm and length 38 µm. The core region of the heater may have a length which is between 2 µm and 4 µm smaller than that of the via for the EAM electrode-SiGe slab. The core region of the heater may have a width which is between 1 µm and 5 µm smaller than half the width of the via. Whilst the heater here has a width of 17 µm, as mentioned above other values may be used. Generally the width of the heater is defined as: $w_{heater}=n \times w_{strip}+(n-1) \times g$.

Figure 6A:
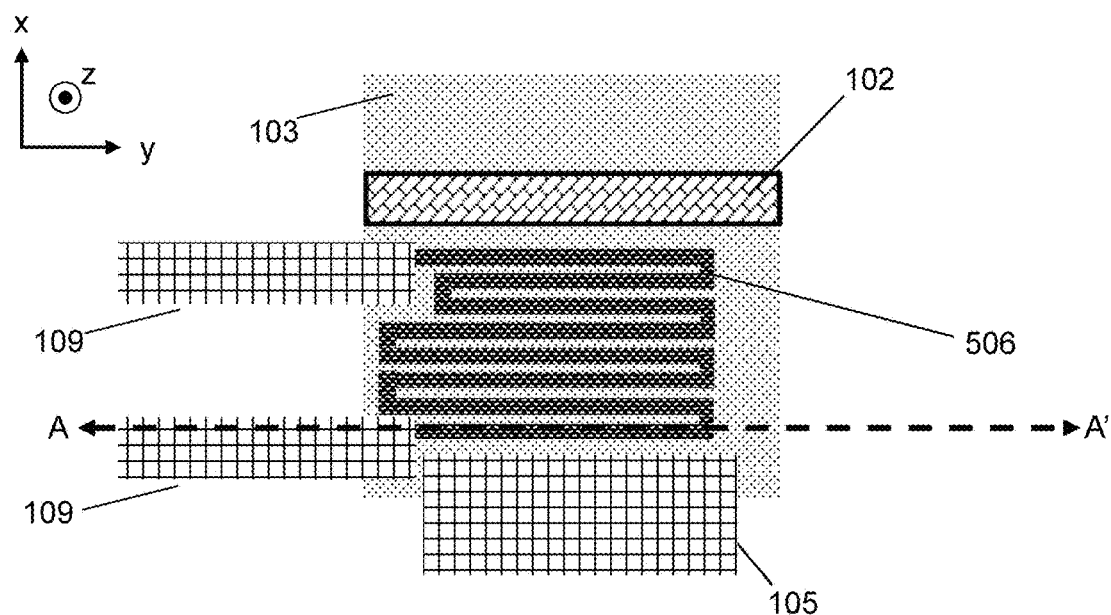
FIG. 6A shows a top-down view of a variant optoelectronic device.
Figure 6B:
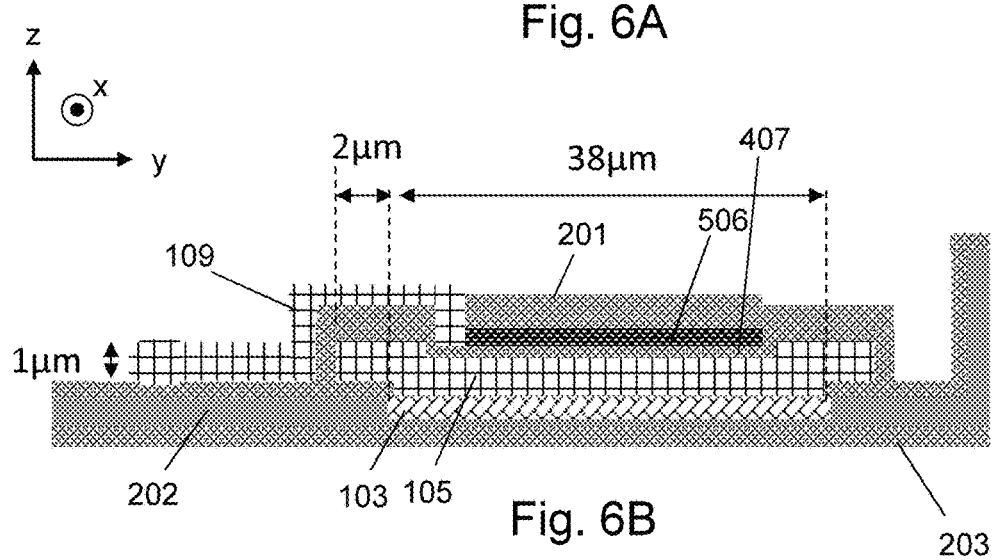
FIG. 6B shows a cross-section of the device in FIG. 6A along the line A-A'.
Figure 6C:
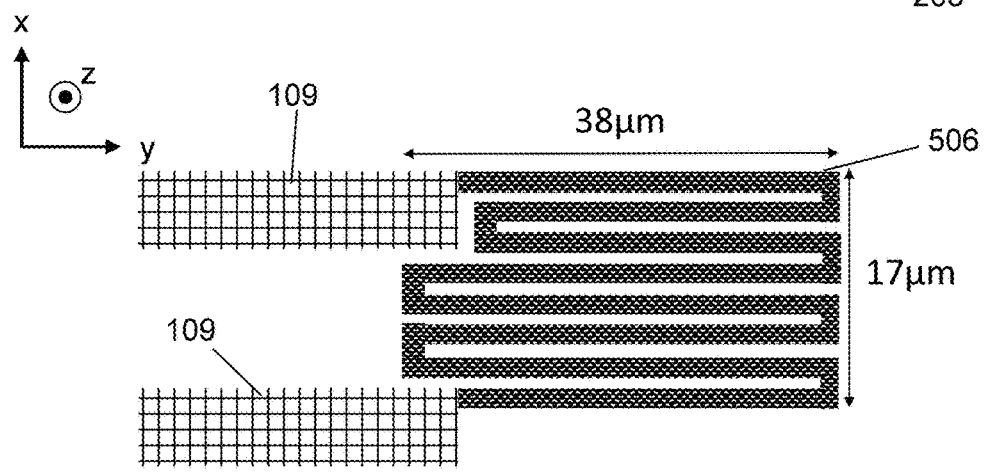
FIG. 6C shows a top-down view of the variant heater in 6A for the optoelectronic device.

FIG. 6A shows a partial top-down view of a further variant device. Here, the heater 506 is similar to the heater 406 disclosed previously except that the metal traces 109 extend away from the silicon-on-insulator layer 202 in the z direction, and then further onto the slab region. This is shown most clearly in FIG. 6B, where metal traces 109 contact the heater 506 through a via in the upper cladding layer 201 which is above the electrode 105 for the waveguide. FIG. 6C shows a partial top-down view of the heater 506. Here, the core region of the heater still is defined by a rectangular region of width 17 µm and length 38 µm. However, in this example the metal traces 109 extend part of the way into this core region.

Generally, the process flow for providing these devices includes (i) depositing the electrical contact for the waveguide, patterning it, and depositing an oxide cladding; (ii) depositing a 1 µm thick electrical contact and metal traces for the heater, which may be formed from aluminium, and patterning; (iii) depositing a heater layer and patterning, the heater layer may be at least 50 nm and no more than 200 nm thick, for example 100 nm thick; and (iv) depositing an oxide for passivating the heater layer. Steps (ii) and (iii) may be interchanged.

Figure 7A:
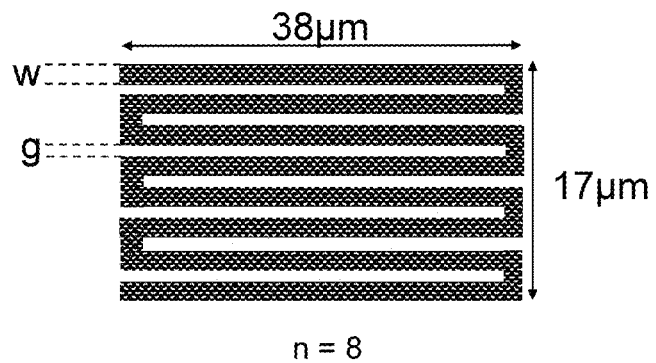
FIG. 7A-7C show, respectively, top-down views of variant heater elements for an optoelectronic device.
Figure 7B:
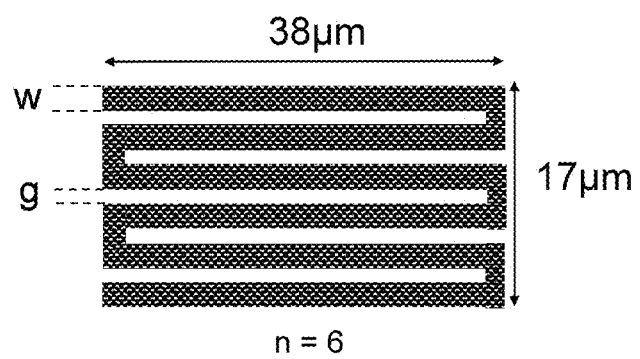
Figure 7C:
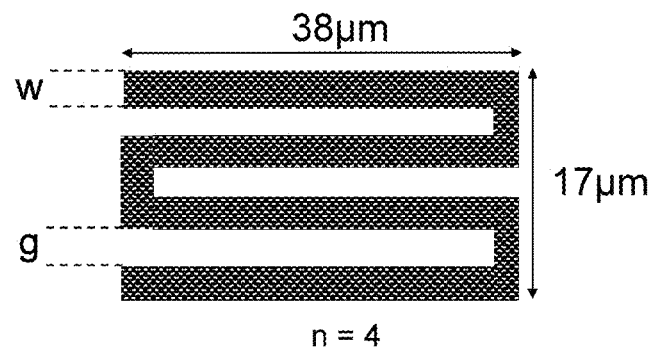

FIGS. 7A-7C show partial top-down views of three variant heaters. In each, the number of metal strips 810 varies. For example, in the example shown in FIG. 7A there are eight metal strips. As the overall footprint of the heater remains the same, e.g. 38 µm by 17 µm, the thickness of the gap g vary as n the number of strips varies. Generally the heater can be more efficient if n is minimised. Varying these properties changes the parameters as set out in table 2 below:

TABLE 2

| Under-cut | trench | n | g (µm) | Efficiency (° C./mW) | R (Ω) | I (mA) | $V_{in}$ (V) | Power (mW) | $T_{heater}$ (° C.) |
|---|---|---|---|---|---|---|---|---|---|
| N | N | 1 | N/A | 0.37 | 80 | 34 | 2.7 | 94 | 385 |
| N | N | 3 | 1.5 | 0.33 | 246 | 21 | 5.1 | 105 | 200 |
| N | N | 5 | 1.5 | 0.30 | 412 | 17 | 6.8 | 114 | 155 |
| Y | Y | 1 | 1.5 | 1.02 | 80 | 21 | 1.6 | 34 | 180 |
| Y | Y | 3 | 1.5 | 0.98 | 246 | 12 | 3.0 | 36 | 109 |
| Y | Y | 5 | 1.5 | 0.94 | 412 | 10 | 3.9 | 37 | 93 | where 'Under-cut' and 'trench' indicate the provision of an under-cut and trench as discussed below; I is the current passing through the heater when ΔT, the average increase in the temperature of the waveguide, is 35° C.; J is the current density when ΔT is 35° C.; and $T_{max}$ is the maximum temperature of the heater when ΔT is 35° C. The examples above included a heater only on one side of the waveguide. There was no buried oxide layer located immediately between the slab portion of the waveguide and the silicon layer, as discussed previously it was replaced with an epitaxial crystalline cladding layer. A buried oxide layer below the silicon layer 605 had a thickness of 0.4 µm, and the heater had a thickness of 100 nm (measured in the z direction) and a width of 2 µm. As discussed above, the width of the heater is generally a function of n, and so the width of the heater is not necessarily constant for all examples in Table 2.

Further characterization was performed by varying the closest distance D between the heater and the ridge portion of the waveguide, as shown in the table below:

TABLE 3

| Under-cut | trench | D (µm) | Efficiency (° C./mW) | I (mA) | $V_{in}$ (V) | Power (mW) | $T_{heater}$ (° C.) |
|---|---|---|---|---|---|---|---|
| N | N | 3 | 0.37 | 34 | 2.7 | 94 | 385 |
| N | N | 5 | 0.34 | 36 | 2.9 | 103 | 427 |
| N | N | 10 | 0.30 | 38 | 3.1 | 117 | 482 |
| Y | Y | 3 | 1.02 | 21 | 1.6 | 34 | 180 |
| Y | Y | 5 | 0.99 | 21 | 1.7 | 35 | 188 |
| Y | Y | 10 | 0.94 | 22 | 1.7 | 37 | 197 |

The examples above included a heater only on one side of the waveguide. There was no buried oxide layer located immediately between the slab portion of the waveguide and the silicon layer, as discussed previously it was replaced with an epitaxial crystalline cladding layer. A buried oxide layer below the silicon layer 605 had a thickness of 0.4 µm, and the heater had a thickness of 100 nm (as measured in the z direction) and a width of 2 µm. This resulted in a heater with an electrical resistance of 80Ω. I, $V_{in}$, Power and $T_{heater}$ were all measured when ΔT=35° C.

Figure 8A:
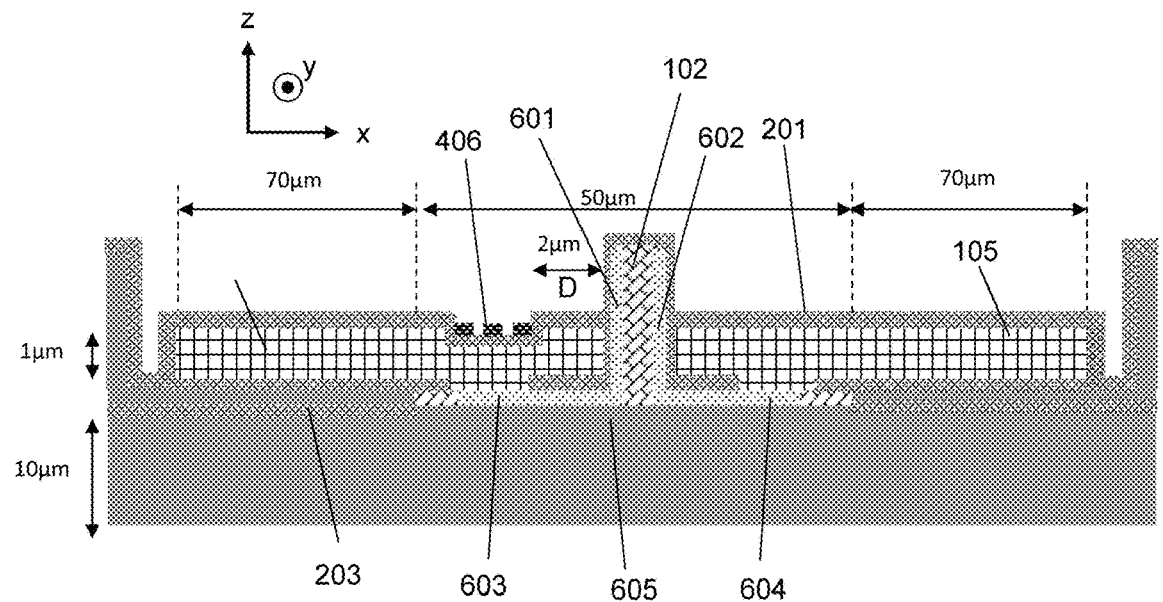
FIGS. 8A and 8B show, respectively, cross-sectional views of variant optoelectronic devices.

FIG. 8A shows a cross sectional view of the device shown in FIG. 4A along the cross section A-A'. Shown in this view, are more details of the ridge portion 102, which includes a first doped region 601 and second doped region 602. The first doped region 601 of the ridge may be n-type doped, and the second doped region 602 of the ridge may be p-type doped. The slab portion also comprises first doped region 603 and second doped region 604. The first doped region 603 of the slab may be n-type doped, and the second doped portion 604 of the slab may be p-type doped. Of course the first and second doped regions of the slab and ridge portions may have alternative dopant types. The first doped region 603 and the second doped region 604 of the slab may be more heavily doped as compared to the doped regions of the ridge.

Immediately below the slab portion is an epitaxial crystalline cladding layer 605. The epitaxial crystalline cladding layer may be substantially the same as that disclosed in either U.S. 62/528,900 or U.S. Ser. No. 15/700,055 the entire contents of which is incorporated herein by reference. In some embodiments, the original buried oxide layer in the silicone-on-insulator wafer has been etched away, and replaced with an epitaxially grown crystalline structure (commonly a semiconductor). As is shown clearly in this view of the device, the heater 406 is no closer than 2 μm to the rib waveguide portion 102. Also shown are the electrical pads 105 for connecting to the doped region 603 and 604 of the slab portion. Table 2 below shows the changes in the parameters set out in table 1 when there is an epitaxial crystalline cladding layer 605 immediately below the slab portion:

TABLE 4

| n | w (μm) | g (μm) | Efficiency (° C./mW) | ΔT/$V_{in}$ (° C./V) | R (Ω) | I (mA) | $ΔT_{vert}$ (° C.) | $T_{metal}$ (° C.) |
|---|---|---|---|---|---|---|---|---|
| 4 | 3.5 | 1.0 | 0.23 | 1.72 | 186 | 31 | 0.14 | 74 |
| 6 | 2.0 | 1.0 | 0.23 | 1.06 | 490 | 19 | 0.14 | 76 |
| 8 | 1.2 | 1.0 | 0.24 | 0.72 | 1091 | 13 | 0.15 | 80 |

Where I, J, $ΔT_{vert}$ (the vertical temperature differential in the waveguide), and $T_{metal}$ are when ΔT=10° C.

As can be seen from the table 4, the heaters in examples where there is no buried oxide are slightly less efficient than those with a buried oxide layer. Asides from this, the heaters operated similarly those implemented above a buried oxide layer.

Figure 8B:
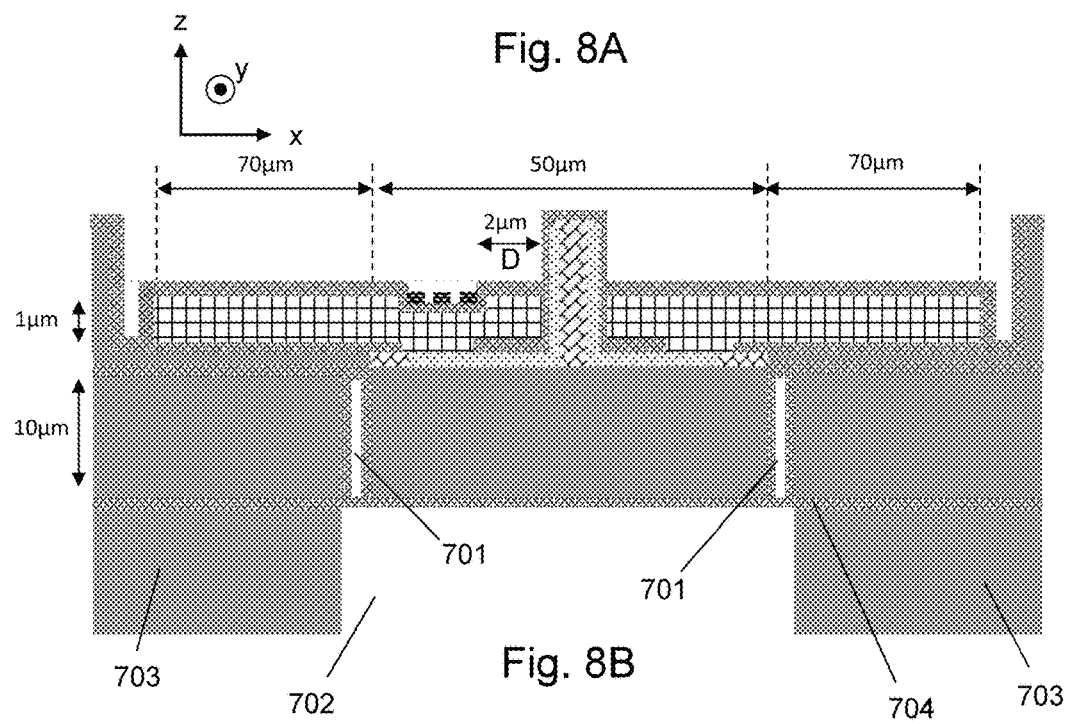

A variant example is shown in FIG. 8B, which is the same cross-sectional view as shown in FIG. 8A. In contrast to the embodiment shown in FIG. 8A, this example includes thermal isolation trenches 701 located either side of the bottom cladding layer 605. The bottom cladding layer, as discussed above may be an epitaxial crystalline cladding layer. The thermal isolation trenches 701 may be formed of either entirely silicon dioxide, or a silicon dioxide outer wall defining a volume filled with air. Immediately below the bottom cladding area 605, is a further buried oxide layer 704 on the other side of which is a cavity 702. This further buried oxide layer may also be present in the example shown in FIG. 8A, but in this example there would be a silicon substrate on the other side thereof. The cavity 702 is characterised by being absent of any silicon, and is formed in between silicon side walls 703. The cavity 702, which may be referred to as an undercut, may be as wide as or wider than the width of the slab portion.

Both the thermal isolation trenches 701 and cavity 702 may act to thermally isolate the heater and rib waveguide portion from the remainder of the device. This insulation can enhance the efficiency of the heater, and also ensure a more uniform temperature distribution through the rib and slab portions.

Figure 9:
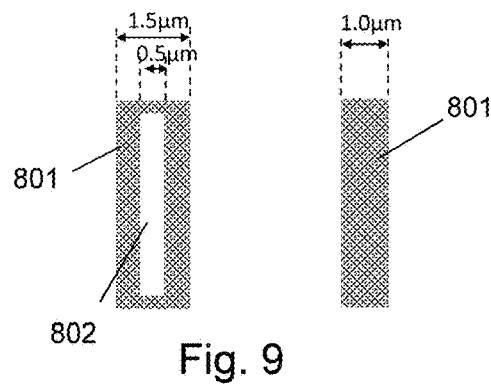
FIG. 9 shows two examples of thermal isolation trenches.

As shown in the left-hand side of FIG. 9, the thermal isolation trench may either comprise a silicon dioxide outer wall 801 enclosing a volume 802 filled with air; or, the thermal isolation trench may be entirely filled with silicon dioxide 801 as shown in the FIG. on the right. The width of the trench may be from at least 0.5 μm to at most 2.0 μm. If the width is ≤1.0 μm then the trench may be completely filled with $SiO_2$. If the width is >1.0 μm, the trench may have the volume filled with air.

By varying the design parameters of these devices, embodiments according to the present invention possess the following properties:

TABLE 5

| BOX (μm) | Under-cut | Trench | Efficiency (° C./mW) | I (mA) | $V_{in}$ (V) | Power (mW) | $T_{heater}$ (° C.) |
|---|---|---|---|---|---|---|---|
| 0.4 | N | N | 0.37 | 34 | 2.7 | 94 | 385 |
| 1.0 | N | N | 0.45 | 31 | 2.5 | 78 | 329 |
| 2.0 | N | N | 0.55 | 28 | 2.3 | 64 | 282 |
| 3.0 | N | N | 0.63 | 27 | 2.1 | 56 | 255 |
| 0.4 | N | Y | 0.41 | 33 | 2.6 | 86 | 359 |
| 1.0 | N | Y | 0.53 | 29 | 2.3 | 66 | 289 |
| 2.0 | N | Y | 0.67 | 26 | 2.0 | 52 | 241 |
| 3.0 | N | Y | 0.78 | 24 | 1.9 | 45 | 216 |
| 0.4 | Y | N | 0.57 | 28 | 2.2 | 61 | 273 |
| 0.4 | Y | Y | 1.02 | 21 | 1.6 | 34 | 180 |

In the examples disclosed in this table, there was no buried oxide layer present immediately below the slab portion of the waveguide. That buried oxide layer was replaced with an epitaxial crystalline cladding layer as discussed above. Further, the heater comprised a single metal strip with a thickness of 100 nm, width of 2 μm and a length of 38 μm, which had an electrical resistance of 80Ω. 'BOX' indicates the height (as measured in the z direction) of the buried oxide layer 704 between the cavity 702 and the slab portion of the waveguide. The column 'Under-cut' and 'Trench' indicate if a trench or under-cut (also referred to as a cavity) are present in the example. I, $V_{in}$, Power, and $T_{heater}$ are all given for a value of ΔT of 35° C.

Alternatively, there may be a buried oxide layer 203 which extends between the slab portion of the waveguide 603 and the silicon-on-insulator layer 605. Generally this buried oxide layer would be around 0.4 μm thick (as measured in the z direction). Again, by varying the design parameters of the device, devices according to some embodiments of the present invention possess the following properties:

TABLE 6

| BOX (μm) | Under-cut | Trench | Efficiency (° C./mW) | I (mA) | $V_{in}$ (V) | Power (mW) | $T_{heater}$ (° C.) |
|---|---|---|---|---|---|---|---|
| 0.4 | N | N | 0.59 | 27 | 2.2 | 60 | 276 |
| 1.0 | N | N | 0.66 | 26 | 2.1 | 53 | 252 |
| 2.0 | N | N | 0.76 | 24 | 1.9 | 46 | 228 |
| 3.0 | N | N | 0.84 | 23 | 1.8 | 42 | 213 |
| 0.4 | N | Y | 0.64 | 26 | 2.1 | 55 | 259 |
| 1.0 | N | Y | 0.77 | 24 | 1.9 | 45 | 226 |
| 2.0 | N | Y | 0.94 | 22 | 1.7 | 37 | 197 |
| 3.0 | N | Y | 1.06 | 20 | 1.6 | 33 | 180 |

TABLE 6-continued

| BOX (μm) | Under-cut | Trench | Efficiency (° C./mW) | I (mA) | $V_{in}$ (V) | Power (mW) | $T_{heater}$ (° C.) |
|---|---|---|---|---|---|---|---|
| 0.4 | Y | N | 0.77 | 24 | 1.9 | 45 | 225 |
| 0.4 | Y | Y | 1.63 | 16 | 1.3 | 21 | 139 |

In the examples disclosed in this table, the buried oxide layer 203 extends across the entire width of the device, and so is present immediately below the slab portion of the waveguide and has a width of 0.4 μm. The heater comprised a single metal strip, with a thickness of 100 nm and a width of 2 μm and had an electrical resistance of 80Ω. I, $V_{in}$, Power, and $T_{heater}$ are all given for a value of ΔT of 35° C. In the examples in both tables above, the heater length (L) was 38 μm. As is understood, the efficiency of the heater scales as 1/L and the required power for a given ΔT scales as L.

FIG. 10 shows a further variant device, and like features are indicated by like reference numerals. In contrast to previous devices, the device shown in FIG. 10 further includes a thermal guard ring 901 which comprises a plurality of thermal isolation trenches 701 as described previously. These thermal isolation trenches extend around a periphery of the slab portion 103 to thereby define the thermal guard ring.

Figure 11A:
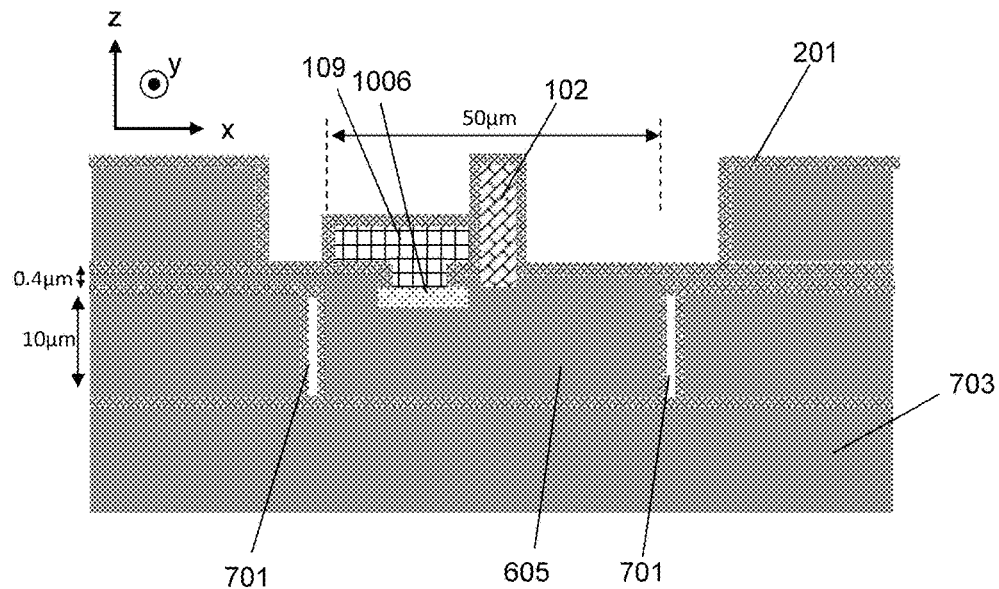
FIG. 11A shows a cross-sectional view of a variant optoelectronic device.

FIG. 11A shows a further variant device, and like features are indicated by like reference numerals. In contrast to previous devices, the heater in this example comprises a doped region 1006 in the bottom cladding layer 605. As discussed previously the bottom cladding layer 605 may be an epitaxial crystalline bottom cladding layer. In this example, the doped heating region 1006 is less than 2 μm from the rib waveguide 102, although of course the skilled person will understand that (as in previous examples) all parts of the heater may be at least 2 μm away from the rib waveguide portion. In this example, the metal trace 109 connecting the heater to the electrical pads extends through the upper cladding area so as to electrically contact the doped region 1006. The doped region comprising the heater may be a heavily doped region e.g. n++ or p++.

Figure 11B:
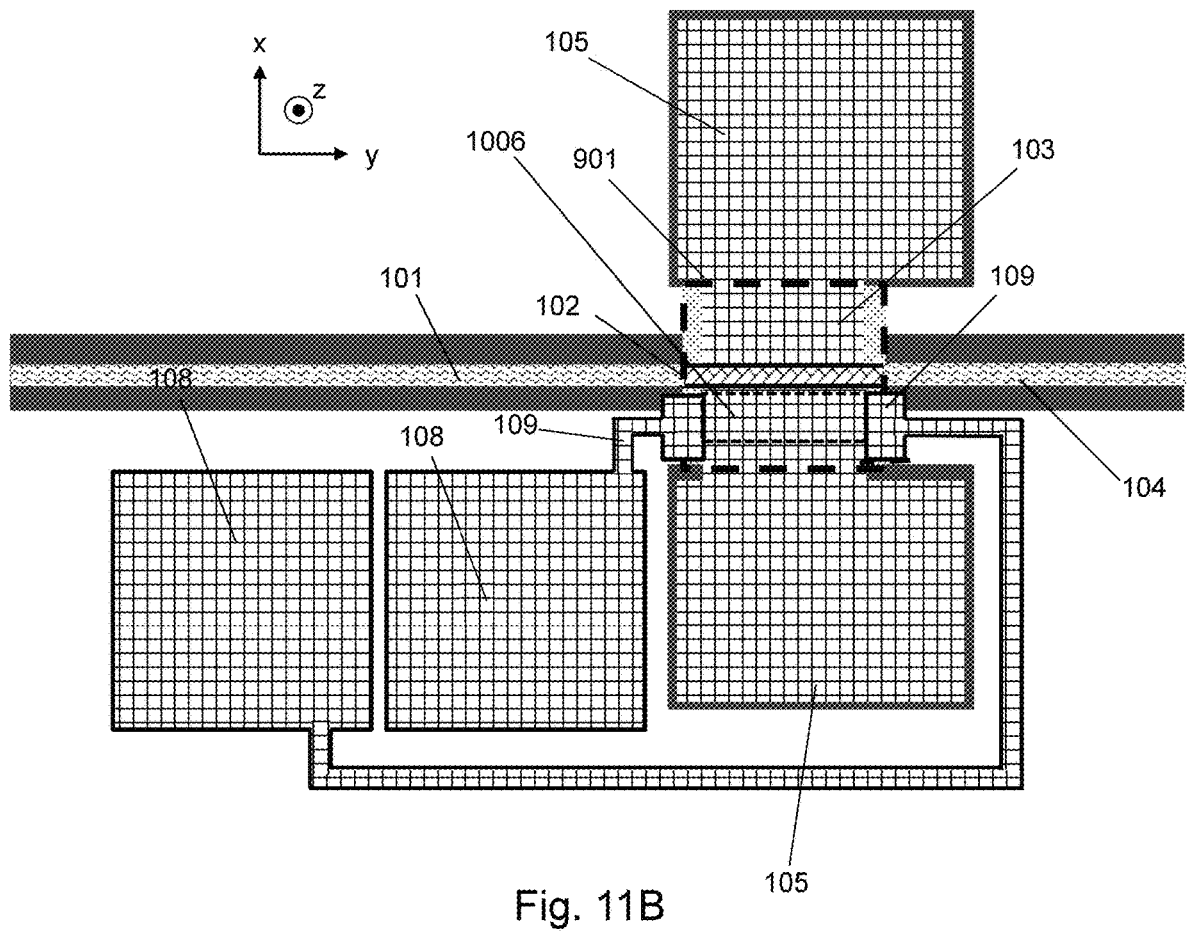
FIG. 11B shows a top-down view of the optoelectronic device of FIG. 11A.

FIG. 11B is a top down view of the device shown in FIG. 11A. Here the dotted region indicated by reference 1006 shows the approximate location of the doped heating element relative to the slab portion 103. Metal traces 109 contact the doped region 1006 at either end of the buried heater. This example also includes the thermal guard ring 901 as discussed above.

Figure 12A:
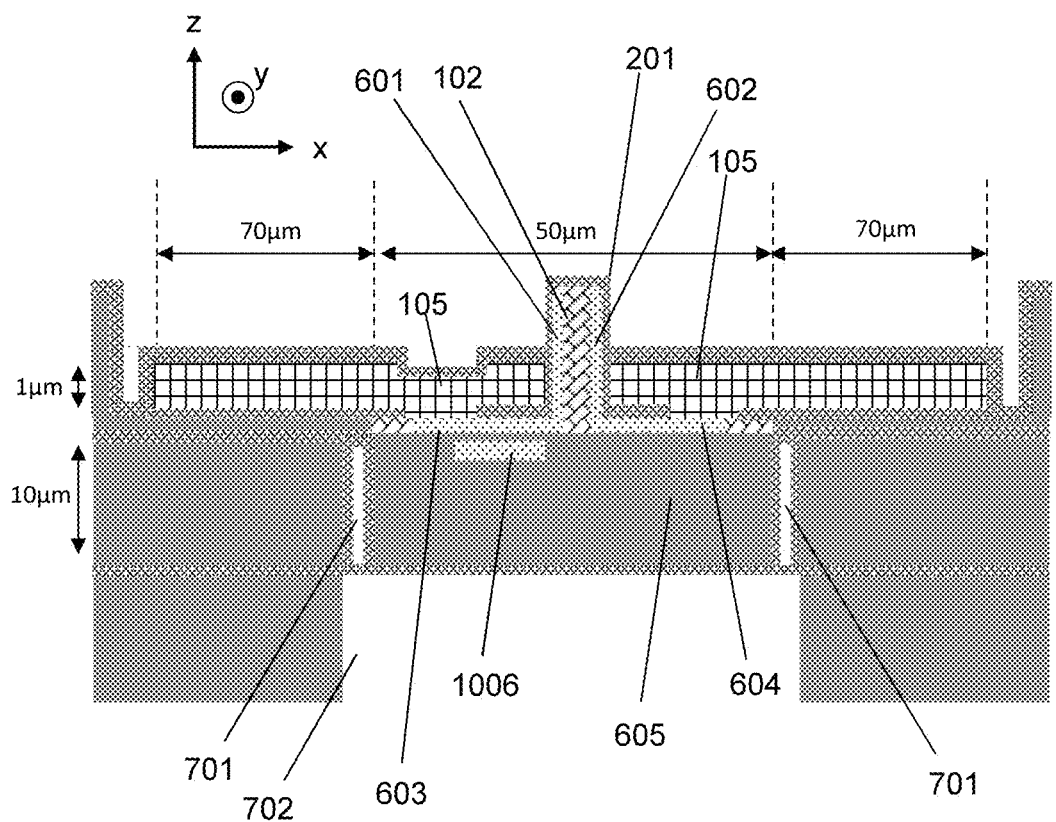
FIG. 12A shows a cross-sectional view of a variant optoelectronic device, and 12B shows an enlarged section of the device shown in FIG. 12A.

FIG. 12A shows a further example of the doped heater 1006 discussed above. In this example both thermal isolation trenches 701 and cavity 702 are present as discussed above. As can be seen more clearly in FIG. 12A, there exists a portion of un-doped bottom cladding area 605 in between the first doped region 603 of the slab to electrically isolate it from the doped heater 1006. This un-doped portion of the bottom cladding layer may be around 400 nm thick. The efficiency of the heater in this example is around 0.9° C./mW. Without the thermal isolation trenches but with the cavity, the efficiency is around 0.35° C./mW. Without the cavity, but with the thermal isolation trenches, the efficiency is around 0.24° C./mW. Without either the cavity or the thermal isolation trenches, the efficiency of the heater is around 0.20° C./mW.

Figure 12B:
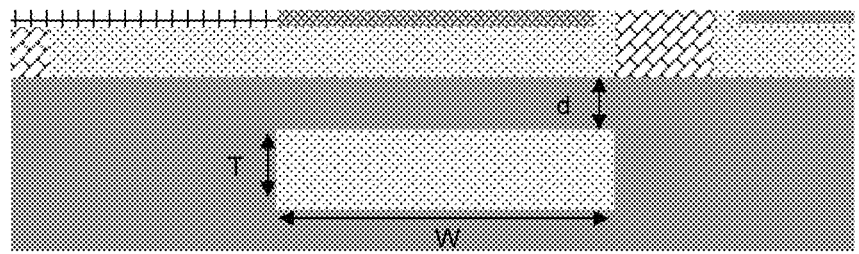

FIG. 12B shows an enlarged section of the device shown in FIG. 12A. Here the width of the heater 1006 is indicated, as is its height T, and the thickness d of the undoped region.

Varying some of the parameters of the device alters the properties as set out in table 4 below:

TABLE 7

| T (nm) | W (μm) | Efficiency (° C./mW) | R (Ω) | I (mA) | $V_{in}$ (V) | Power (mW) | $T_{heater}$ (° C.) |
|---|---|---|---|---|---|---|---|
| 200 | 2 | 1.25 | 285 | 10 | 2.8 | 27 | 64 |
| 200 | 5 | 1.24 | 114 | 16 | 1.8 | 28 | 63 |
| 200 | 10 | 1.21 | 57 | 23 | 1.3 | 29 | 64 |
| 200 | 20 | 1.16 | 29 | 33 | 0.9 | 30 | 64 |
| 150 | 5 | 1.24 | 152 | 14 | 2.1 | 28 | 63 |
| 100 | 5 | 1.24 | 228 | 11 | 2.5 | 28 | 63 |

In these examples, the buried oxide layer below the heater 1006 had a height as measured in the z direction of 0.4 μm, and all examples included a cavity or under-cut as well as thermal isolation trenches. The parameters I, $V_{in}$, Power, and $T_{heater}$ are for where ΔT=35° C. As can be seen, the efficiency does not have a strong dependence on W or T. It was also seen that a near uniform temperature distribution was achieved inside the waveguide (with a variation of less than 0.3° C. for an average ΔT of 35° C.). The possible values of W range from at least 1 μm to no more than 20 μm and the possible values for T range from at least 100 nm to no more than 300 nm. In some embodiments, W falls within the range of at least 2 μm and no more than 7 μm, and T falls within the range of at least 150 nm and no more than 200 nm. It was observed that larger values of W, T or a larger doping concentration resulted in a smaller resistance and so larger current. The resistivity for the doped Si was measured as 3 Ω·μm for a doping concentration of around $10^{20}$ cm$^{-3}$ at 300 K.

Figure 13:
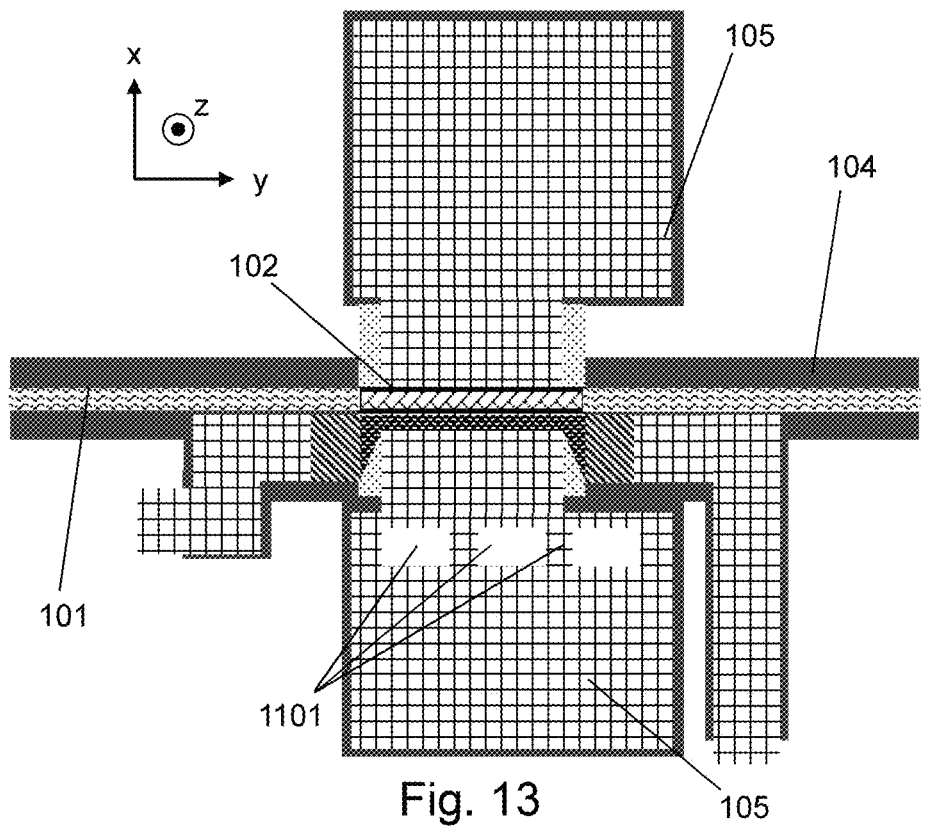
FIG. 13 shows a top-down view of a variant optoelectronic device.

FIG. 13 shows a partial top-down view of a further variant device. Here, the electrodes for the waveguide 105 include one or more cavities 1101 disposed therein. The cavities may be filled with either silicon dioxide or air (as is the case with the thermal isolation trenches discussed above).

Figure 14:
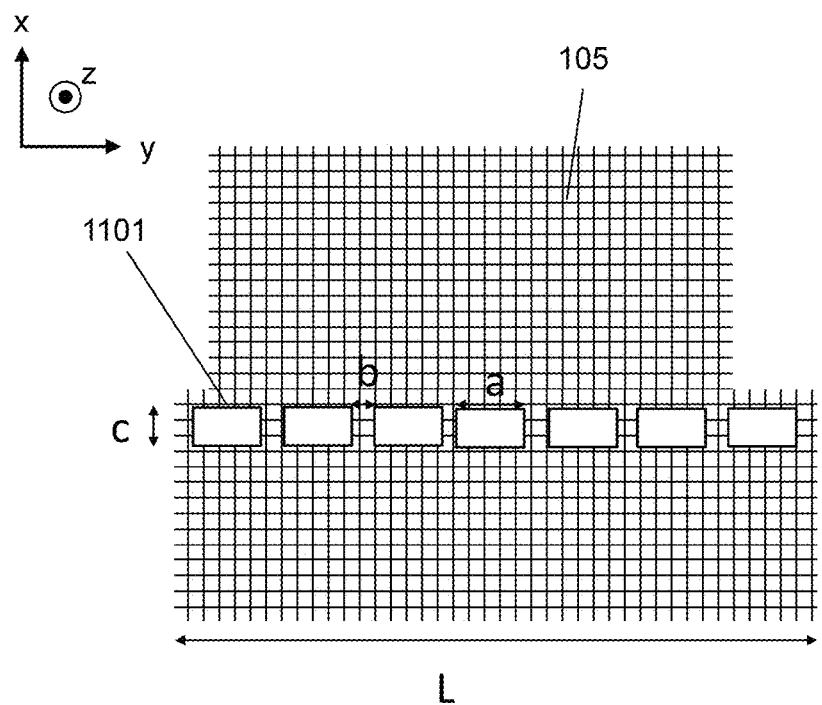
FIG. 14 shows an enlargement of the top-down view of FIG. 13.

FIG. 14 shows an enhanced partial view of the electrode shown in FIG. 13. Here the relative dimensions of the cavities are discussed. a indicates a length of each cavity, b indicates the gap between adjacent cavities, and c indicates the width of each cavity. The overall length of the electrode L imposes the following restraint: L=(N+1)×b+(N×a), where N is the number of cavities. L may take a value of at least 50 μm to no more than 100 μm, and, in some embodiments, may be at least 50 μm and no more than 70 μm. Correspondingly, n may be at least 2 and no more than 30 or, in some embodiments, at least 5 and no more than 10. a may take a value of at least 2 μm and no more than 30 μm, or, in some embodiments, at least 5 μm and no more than 10 μm. b may take a value of at least 1 μm and no more than 20 μm, or, in some embodiments, at least 1 μm and no more than 3 μm. c may take a value of at least 1 μm and no more than 10 μm, or, in some embodiments, at least 3 μm and no more than 5 μm. By providing such cavities, an increase in heater efficiency of around 30% may be achieved. This is chiefly due to the enhancement in thermal isolation with respect to the heater and waveguide.

Figure 15A:
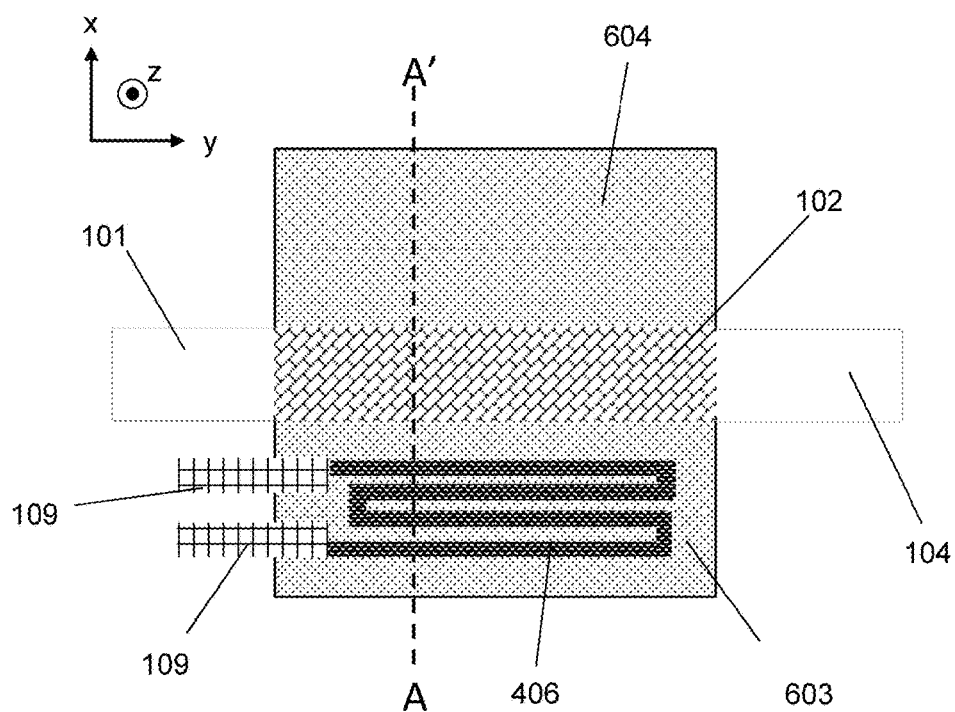
FIG. 15A shows a top-down view of a variant optoelectronic device.
Figure 15B:
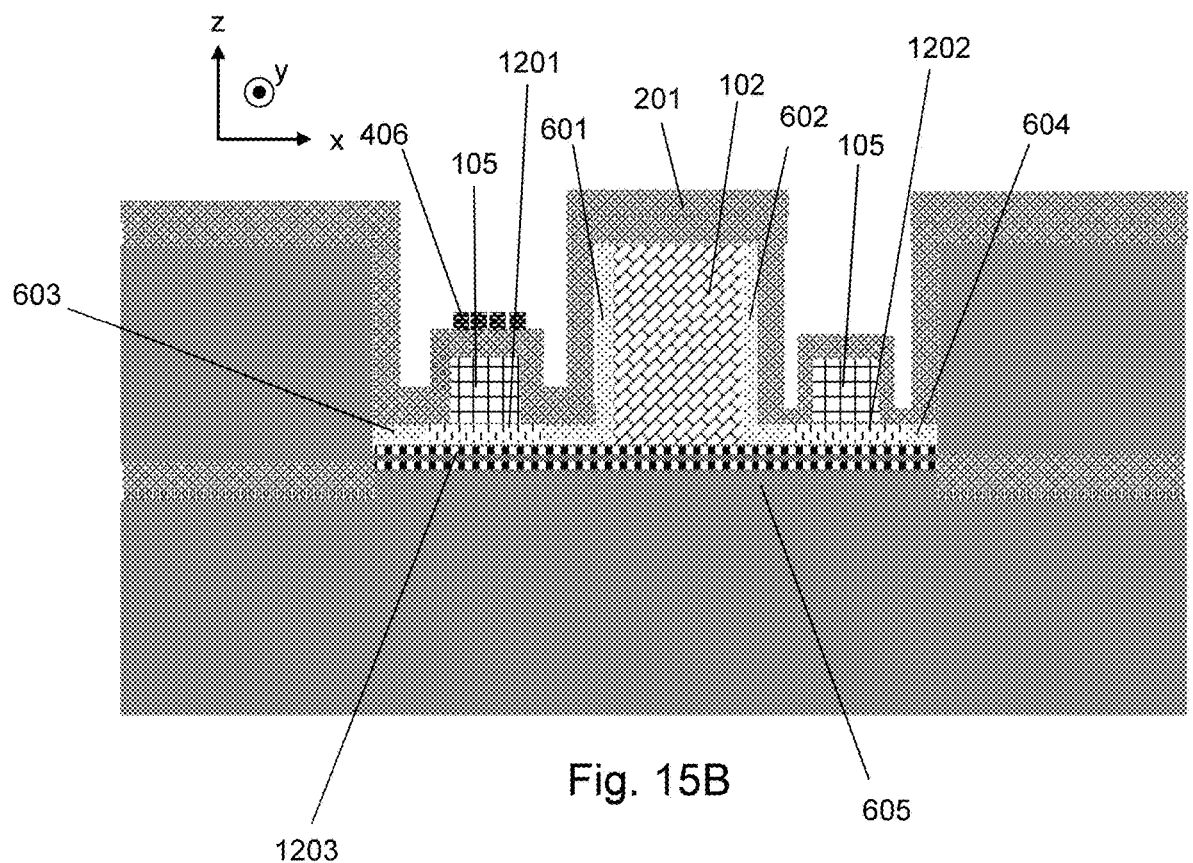
FIG. 15B shows a cross-sectional view of the device of FIG. 15A along the line A-A'.

FIGS. 15A and 15B show a further variant of the optoelectronic device. In FIG. 15A, a serpentine heater 406 formed of plural metal strips, is located directly above the first doped region 603 of the slab portion. The closest part of this heater is at least 2 μm away from the rib waveguide portion 102. The entire device sits within a cavity of a silicon-on-insulator layer which has a height (as measured from the buried oxide layer) of around 3 μm. A cross-section along the line A-A' is shown in FIG. 15B. As can be seen here, in between the epitaxial crystalline cladding layer 605 and the slab portion is a crystalline rare earths oxide (CREO) or a rare earths oxide (REO) layer 1203 which can be used to further increase the crystalline quality of the slab when grown. The layer 1203 may have a thickness of from at least 20 nm to no more than 400 nm. The crystal lattice orientation of the epitaxial crystalline cladding layer and the CREO or REO layer may be (111). Moreover, the device include heavily doped regions 1201 and 1202 which connect respectively to electrical pads 105. The heavily doped regions can decrease the series resistance of the doped portions of both the slab and rib.

Figure 16:
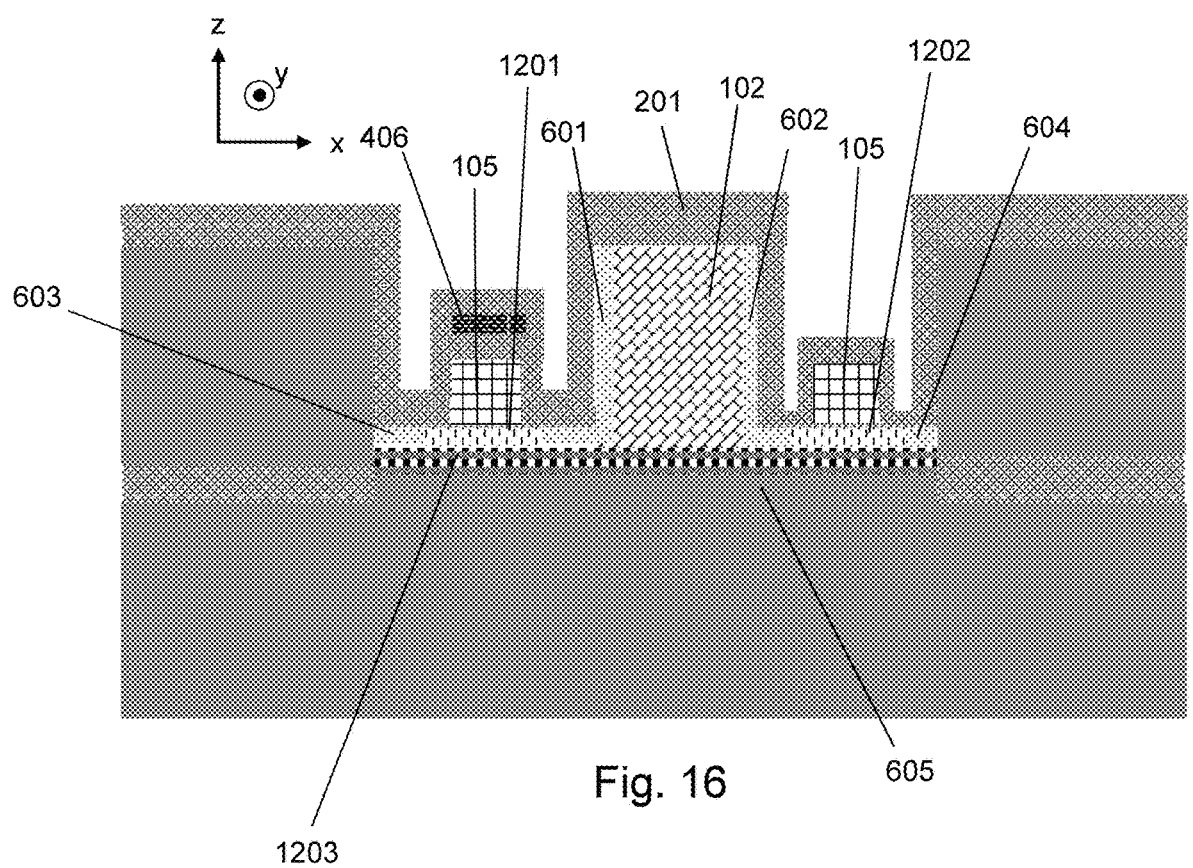
FIG. 16 shows a cross-sectional view of a variant of the device of FIG. 15A along the line A-A'.

FIG. 16 shows a variant structure to that shown in FIG. 15B, the difference here being that an upper cladding layer 201 completely encloses the heater 406 on an upper surface.

Figure 17A:
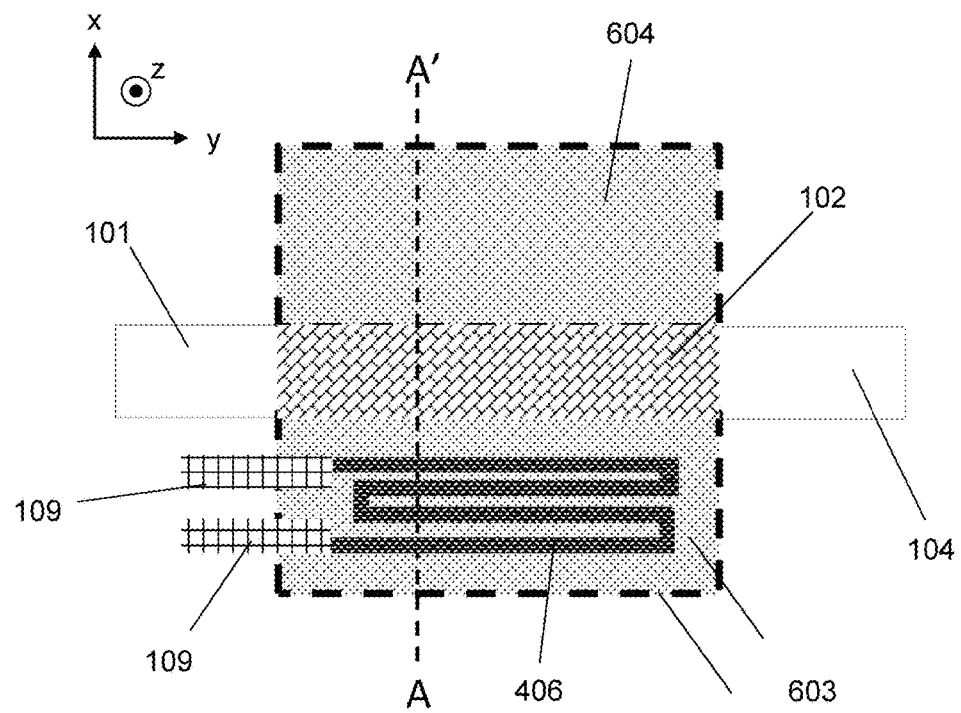
FIG. 17A shows a top-down view of a variant optoelectronic device.
Figure 17B:
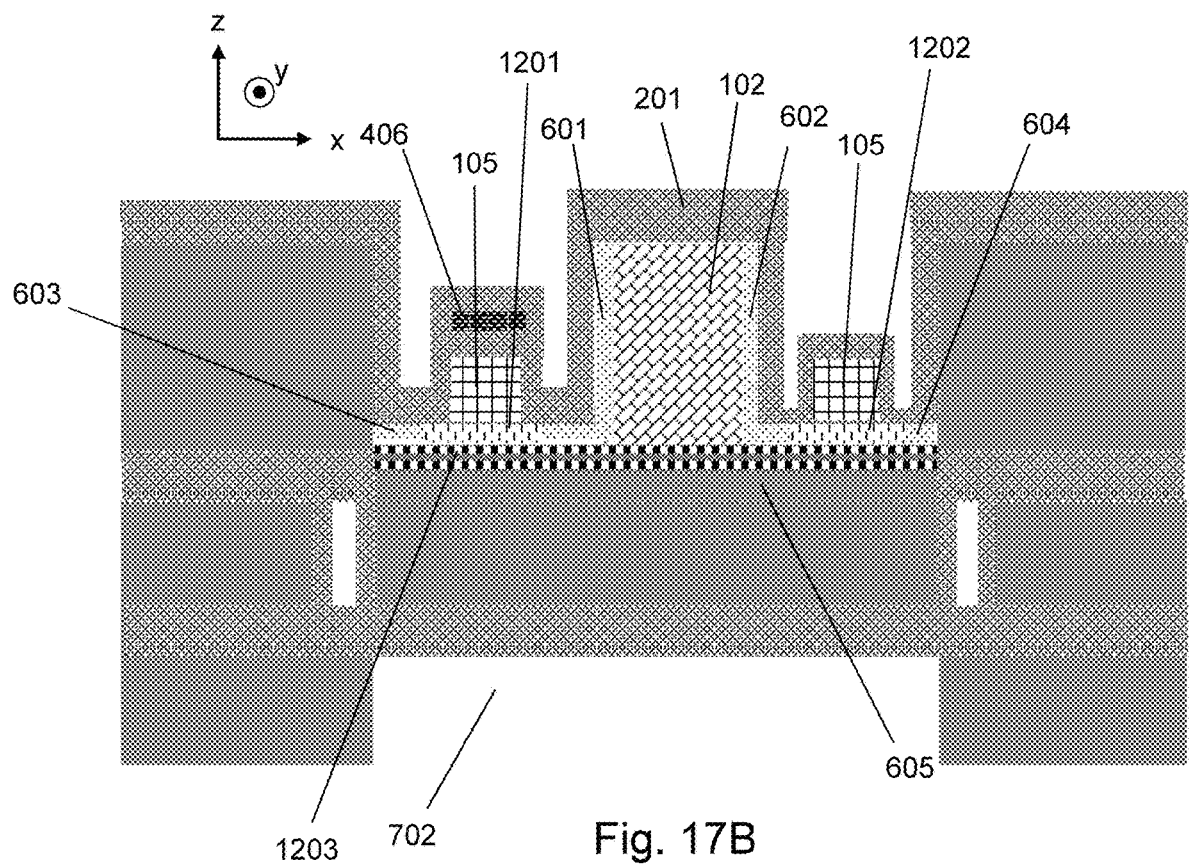
FIG. 17B shows a cross-sectional view of the device of FIG. 16A along the line A-A'.

FIGS. 17A and 17B show a further variant device. In contrast to the example disclosed in FIG. 16, this device further includes the thermal guard ring 2101 (as discussed above), and also the cavity 702 located on an opposing side of the buried oxide layer to the bottom cladding layer 605.

As regards to the heaters discussed above which are formed of plural metal strips, in some examples the heater may be formed of Ti or TiN in accordance with the following:

TABLE 8

| Material | Deposition rate | Dry etch rate | Deposition time for 100 nm thickness | Dry etch time for 100 nm thickness |
| --- | --- | --- | --- | --- |
| Ti | 5-6.5 nm/min @ 500 W | 60 nm/min | ~20 minutes | 1.7 minutes |
| TiN | 2.4 nm/min @ 800 W | 60 nm/min | ~42 minutes | 1.7 minutes |

Figure 18A:
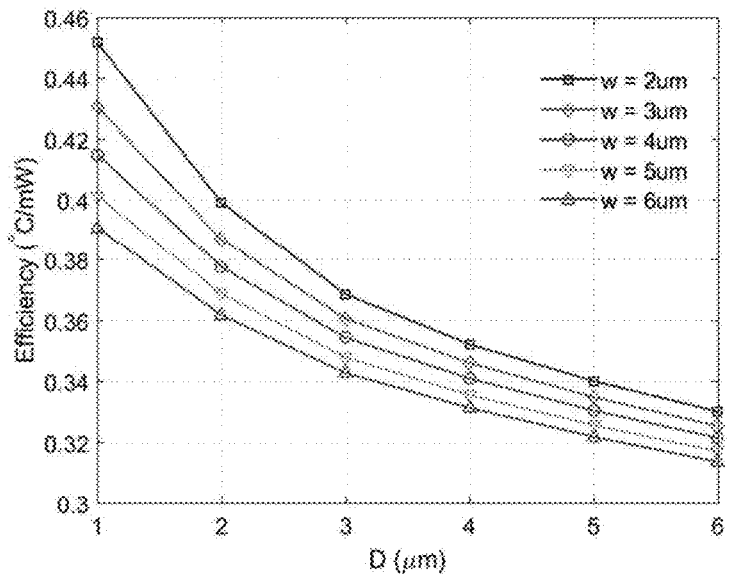
FIGS. 18A-18D are plots showing the results of a simulation of various devices.
Figure 18B:
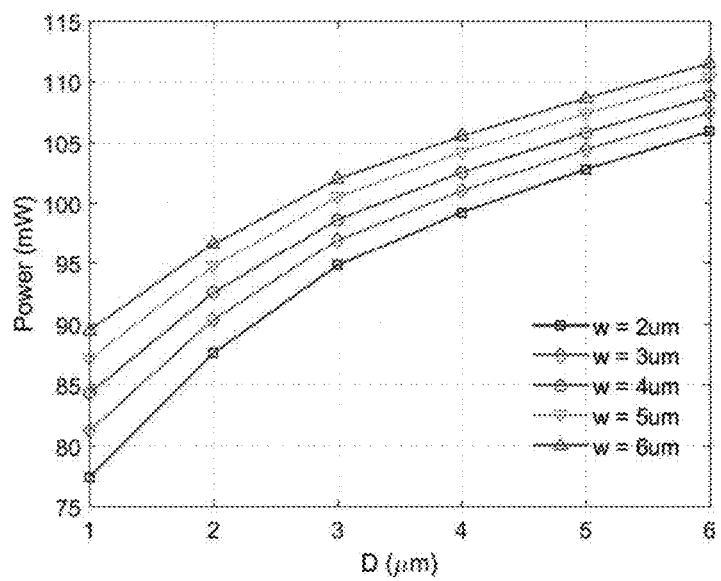
Figure 18C:
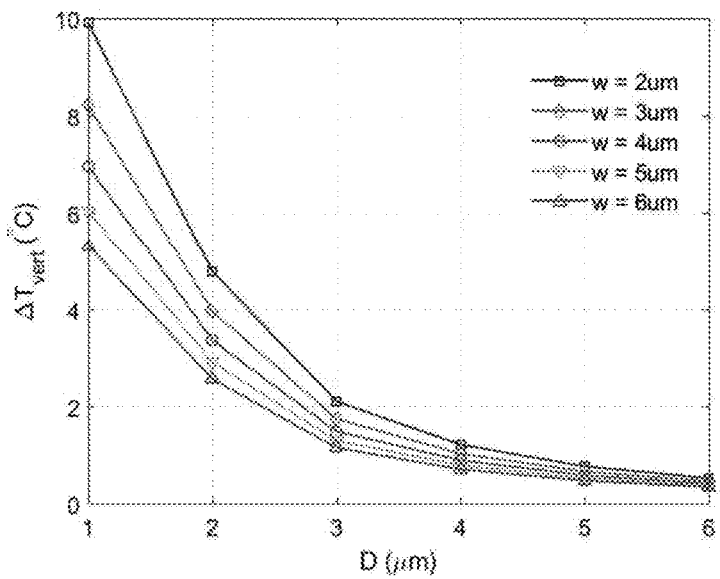
Figure 18D:
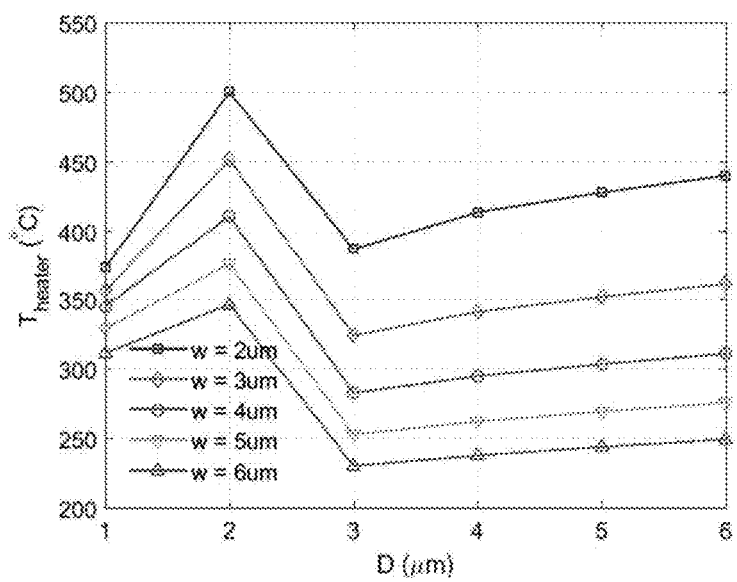
Figure 19A:
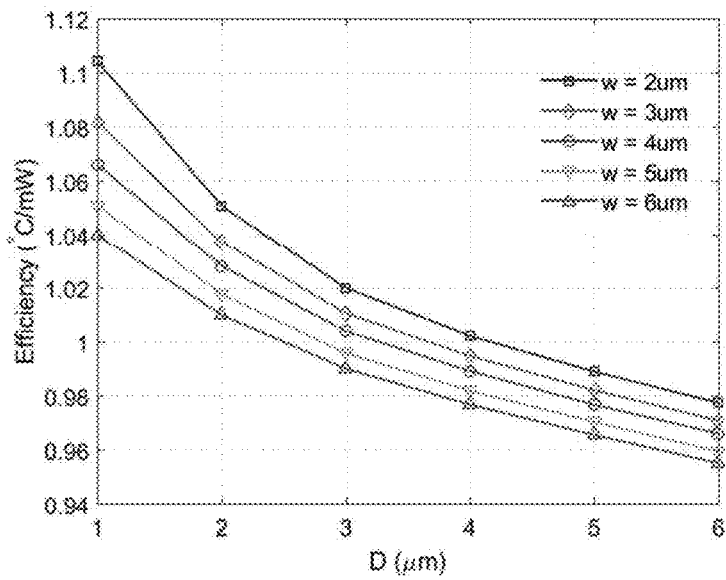
FIGS. 19A-19D are plots showing the results of a simulation of various devices.
Figure 19B:
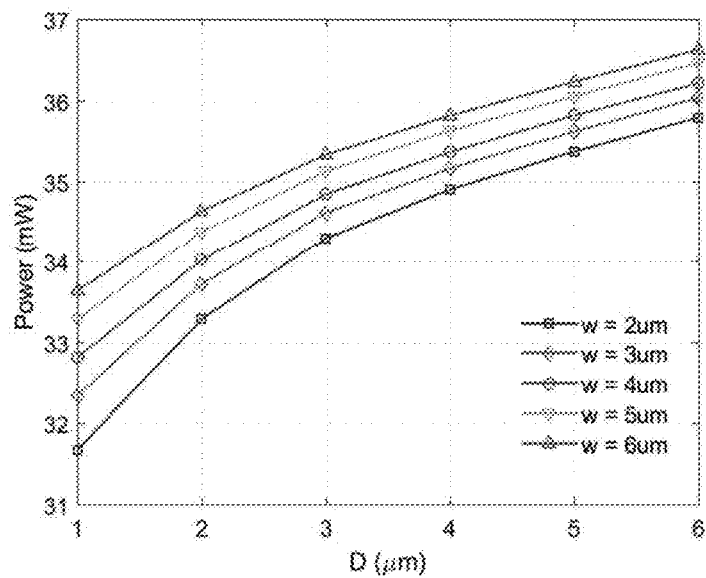
Figure 19C:
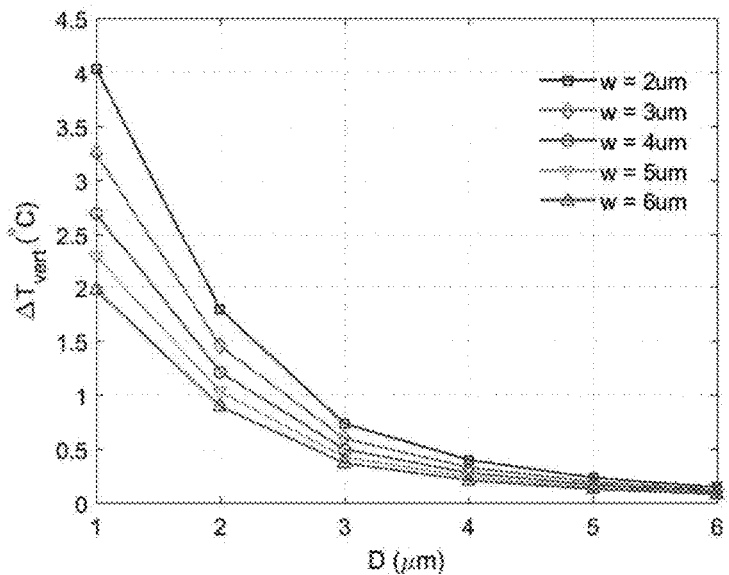
Figure 19D:
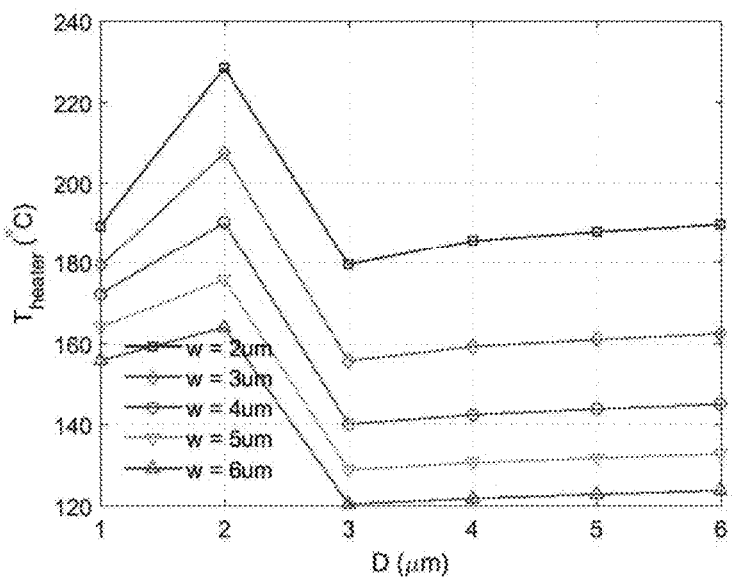

FIGS. 18A-18D are plots showing the results of a simulation of various devices according to some embodiments of the present invention, FIG. 18A is a plot of efficiency against D, the minimum distance between the heater and the ridge portion, and FIG. 18B is a plot of power against D in order to obtain a ΔT value of 35° C. Whilst the efficiency decreases with increasing D, and the required power increases with increasing D, a much increased temperature uniformity ($\Delta T_{vert}$) can be observed in FIG. 18C. FIG. 18D is a plot of heater temperature against D in order to obtain a ΔT value of 35° C. The device simulated in FIGS. 18A-18D had the following parameters: one heater; =1; t=100 nm; no undercut, and no trench provided. The multiple lines on each plot indicate devices with varying values of w.

FIGS. 19A-19D are plots showing results of a simulation of various devices according to some embodiments of the present invention. These plots mirror those shown in FIGS. 18A-18D. However, the devices simulated for FIGS. 19A-19D were provided with an undercut and trench as discussed above. As can be seen then, when comparing these plots to those in FIGS. 18A-18D, the efficiency is increased and the required power decreases.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

LIST OF FEATURES

Optoelectronic device 100
Input waveguide 101
Ridge portion of rib waveguide 102
Slab portion of rib waveguide 103
Output waveguide 104
Electrical pad for waveguide 105
Heater 106, 406, 506, 1006
Junction 107
Electrical pad for heater 108
Metal trace 109
Upper cladding layer 201
Silicon-on-insulator layer 202
Buried oxide 203
Silicon substrate 204
Insulator layer 407
$1^{st}$ doped region of rib 601
$2^{nd}$ doped region of rib 602
$1^{st}$ doped region of slab 603
$2^{nd}$ doped region of slab 604
Silicon layer 605
Thermally insulating trench 701
Thermally insulating cavity 702
Silicon substrate 703
$SiO_2$ wall 801
Air cavity 802
Thermal guard ring 901
Cavity in electrical pad 1101

Clauses

1. An optoelectronic device, including:
a rib waveguide, the rib waveguide including:
  a ridge portion, which includes a temperature-sensitive optically active region,
  and a slab portion, positioned adjacent to the ridge portion;
the device further comprising a heater, disposed on top of the slab portion wherein a part of the heater closest to ridge portion is at least 2 μm away from the ridge portion.

2. The optoelectronic device of clause 1, wherein a width of a first region of the heater tapers from a first width to a second width in a direction substantially parallel to a guiding direction of the rib waveguide.

3. The optoelectronic device of clause 2, wherein the width of a second region of the heater increases from the second width to the first width along the direction substantially parallel to the guiding direction of the rib waveguide.

4. The optoelectronic device of clause 1, wherein the heater comprises plural metal strips, connected at one end to an adjacent metal strip so as to form a serpentine form.

5. The optoelectronic device of clause 4, wherein the heater comprises at least 2 metal strips and no more than 20 metal strips.

6. The optoelectronic device of either clause 4 or 5, further including a first and second electrode for the heater, which are electrically connected to the heater on the same side.

7. The optoelectronic device of any of clauses 4-6, wherein each metal strip has a width of at least 0.5 μm and no more than 10 μm.

8. The optoelectronic device of any of clauses 4-7, wherein a gap between adjacent metal strips has a width of at least 0.5 µm and no more than 10 µm.

9. The optoelectronic device of any of clauses 4-8, wherein the heater is formed from any one of: Ti, TiN, TiW, NiCr, or W.

10. The optoelectronic device of any preceding clause, wherein the heater is disposed above an electrical contact for the slab portion and separated therefrom by an insulator.

11. The optoelectronic device of any preceding clause, further including an upper cladding layer disposed on the heater 12. The optoelectronic device of any preceding clause, further including a second heater, substantially identical to the first and disposed on an opposing side of the ridge portion.

13. The optoelectronic device of any preceding clause, further including:
a bottom cladding layer, disposed adjacent to the slab portion; and
a thermal isolation trench, wherein the thermal isolation trench is positioned adjacent to the bottom cladding layer.

14. The optoelectronic device of clause 13, wherein the thermal isolation trench is filled with either air or silicon dioxide.

15. The optoelectronic device of either clause 13 or 14, wherein the thermal isolation trench has a width of at least 0.5 µm and no more than 2.0 µm.

16. The optoelectronic device of any of clauses 13-15, wherein the device includes plural thermal isolation trenches, which are arranged around a periphery of the slab portion.

17. The optoelectronic device of any preceding clause, wherein the device further includes:
a bottom cladding layer, disposed adjacent to the slab portion; and
a thermal isolation cavity, located on an opposing side of the bottom cladding layer to the slab portion.

18. The optoelectronic device of clause 17, further including:
a buried oxide layer, disposed adjacent to a lower surface of the bottom cladding layer, wherein the thermal isolation cavity is located on an opposing side of the buried oxide layer and is adjacent to a silicon substrate.

19. The optoelectronic device of either clause 17 or 18, wherein the thermal isolation cavity has a width which is larger than a width of the slab portion.

20. The optoelectronic device of any preceding clause, further comprising an electrode, electrically connected to either the ridge portion or the slab portion, wherein the electrode includes at least one thermal isolation cavity.

21. The optoelectronic device of clause 20, wherein the electrode comprises plural thermal isolation cavities in an array, wherein the array extends in a direction substantially parallel to the guiding direction of the rib waveguide.

22. The optoelectronic device of clause 21, wherein the array extends for a length of at least 50 µm and no more than 100 µm.

23. The optoelectronic device of any of clauses 20-22, wherein the electrode comprises at least 2 cavities and no more than 30 cavities.

24. The optoelectronic device of any of clauses 20-23, wherein the or each cavity in the electrode has a length of at least 2 µm and no more than 30 µm.

25. The optoelectronic device of any of clauses 20-24, wherein the or each cavity in the electrode has a width of at least 1 µm and no more than 10 µm.

26. The optoelectronic device of any of clauses 21-23, wherein a gap between adjacent cavities in the electrode has a length of at least 1 µm and no more than 20 µm.

27. The optoelectronic device of any of clauses 20-26, wherein the or each cavity in the electrode is filled with air or $SiO_2$.

28. An optoelectronic device, including:
a rib waveguide, the rib waveguide including:
a ridge portion, which includes a temperature-sensitive optically active region,
and a slab portion, positioned adjacent to the ridge portion;
the device further comprising a heater, disposed in an epitaxial crystalline cladding layer which is located beneath the slab portion.

29. The optoelectronic device of clause 28, wherein the heater comprises a doped region of the epitaxial crystalline cladding layer.

30. The optoelectronic device of clause 29, wherein the doped region of the epitaxial crystalline cladding layer extends in a direction substantially parallel to the guiding direction of the rib waveguide.

31. The optoelectronic device either of clauses 29 or 30, wherein the doped region has a width of at least 1 µm and no more than 30 µm.

32. The optoelectronic device of any of clauses 29-31, wherein the doped region has a height of at least 0.1 µm and no more than 0.3 µm.

33. The optoelectronic device of any of clauses 29-32, wherein the doped region has a doping concentration of at least $1 \times 10^{20}$ cm$^{-3}$ and no more than $2.5 \times 10^{20}$ cm$^{-3}$.

34. The optoelectronic device of any of clauses 29-33, further including an undoped region of the epitaxial crystalline cladding layer, the undoped region being located between the doped region and the slab portion.

35. The optoelectronic device of any of clauses 28-34, wherein the device further includes:
a thermal isolation trench, wherein the thermal isolation trench is located adjacent to the epitaxial crystalline cladding layer.

36. The optoelectronic device of clause 35, wherein the thermal isolation trench is filled with either air or silicon dioxide.

37. The optoelectronic device of either clause 35 or 36, wherein the thermal isolation trench has a width of at least 0.5 µm and no more than 2.0 µm.

38. The optoelectronic device of any of clauses 35-37, wherein the device includes plural thermal isolation trenches, which are arranged around a periphery of the slab portion.

39. The optoelectronic device of any of clauses 28-38, wherein the device further includes:
a thermal isolation cavity, located on an opposing side of the bottom cladding layer to the slab portion.

40. The optoelectronic device of clause 39, further including:
a buried oxide layer, disposed adjacent to a lower surface of the bottom cladding layer, wherein the thermal isolation cavity is located on an opposing side of the buried oxide layer and is adjacent to a silicon substrate.

41. The optoelectronic device of either clause 38 or 40, wherein the thermal isolation cavity has a width which is larger than a width of the slab portion.

42. The optoelectronic device of any of clauses 28-41, further including an electrode, electrically connected to either the ridge or the slab portion, wherein the electrode includes at least one thermal isolation cavity.

43. The optoelectronic device of clause 42, wherein the electrode comprises plural thermal isolation cavities in an array, wherein the array extends in a direction substantially parallel to the guiding direction of the rib waveguide.

44. The optoelectronic device of clause 43, wherein the array extends for a length of at least 50 µm and no more than 100 µm.

45. The optoelectronic device of any of clauses 42-44, wherein the electrode comprises at least 2 cavities and no more than 30 cavities.

46. The optoelectronic device of any of clauses 42-45, wherein the or each cavity in the electrode has a length of at least 2 µm and no more than 30 µm.

47. The optoelectronic device of any of clauses 42-46, wherein the or each cavity in the electrode has a width of at least 1 µm and no more than 10 µm.

48. The optoelectronic device of any of clauses 43-45, wherein a gap between adjacent cavities in the electrode has a length of at least 1 µm and no more than 20 µm.

49. The optoelectronic device of any of clauses 42-48, wherein the or each cavity in the electrode if filled with air or $SiO_2$.

50. An optoelectronic device, including:
a rib waveguide, the rib waveguide including:
a ridge portion, which includes a temperature-sensitive optically active region,
and a slab portion, positioned adjacent to the ridge portion;
the device further comprising:
a heater, for heating the temperature-sensitive optically active region;
a bottom cladding layer, disposed adjacent to the slab portion;
and a thermal isolation trench, wherein the thermal isolation trench is positioned adjacent to the bottom cladding layer.

51. The optoelectronic device of clause 50, wherein the thermal isolation trench is filled with either air or silicon dioxide.

52. The optoelectronic device of either of clauses 50 or 51, wherein the thermal isolation trench has a width of at least 0.5 µm and no more than 2.0 µm.

53. The optoelectronic device of any of clauses 50-52, including plural thermal isolation trenches, which are arranged around a periphery of the slab portion.

54. The optoelectronic device of any of clauses 50-53, wherein the heater is disposed on top of the slab portion, and wherein a part of the heater closest to the ridge portion is at least 2 µm away from the ridge portion.

55. The optoelectronic device of clause 54, wherein a width of a first region of the heater tapers from a first width to a second width in a direction substantially parallel to a guiding direction of the rib waveguide.

56. The optoelectronic device of clause 55, wherein the width of a second region of the heater increases from the second width to the first width along the direction substantially parallel to the guiding direction of the rib waveguide.

57. The optoelectronic device of clause 54, wherein the heater comprises plural metal strips, connected at one end to an adjacent metal strip so as to form a serpentine form.

58. The optoelectronic device of clause 57, wherein the heater comprises at least 2 metal strips and no more than 20 metal strips.

59. The optoelectronic device of either clause 57 or 58, further including a first and second electrode for the heater, which are electrically connected to the heater on the same side.

60. The optoelectronic device of any of clauses 57-59, wherein each metal strip has a width of at least 0.5 µm and no more than 10 µm.

61. The optoelectronic device of any of clauses 57-60, wherein a gap between adjacent metal strips has a width of at least 0.5 µm and no more than 10 µm.

62. The optoelectronic device of any of clauses 57-61, wherein the heater is formed from any one of Ti, TiN, TiW, NiCr, or W.

63. The optoelectronic device of any of clauses 54-62, wherein the heater is disposed above an electrical contact for the slab portion and separated therefrom by an insulator.

64. The optoelectronic device of any of clauses 54-63, further including an upper cladding layer disposed on the heater.

65. The optoelectronic device of any of clauses 54-64, further including a second heater, substantially identical to the first and disposed on an opposing side of the ridge portion.

66. The optoelectronic device of any of clauses 50-52, wherein the heater is disposed in the bottom cladding layer which is an epitaxial crystalline cladding layer.

67. The optoelectronic device of clause 66, wherein the heater comprises a doped region of the epitaxial crystalline cladding layer.

68. The optoelectronic device of clause 67, wherein the doped region of the epitaxial crystalline cladding layer extends in a direction substantially parallel to the guiding direction of the rib waveguide.

69. The optoelectronic device of either clause 67 or 68, wherein the doped region has a width of at least 1 µm and no more than 30 µm.

70. The optoelectronic device of any of clauses 67-69, wherein the doped region has a height of at least 0.1 µm and no more than 0.3 µm.

71. The optoelectronic device of any of clauses 67-70, wherein the doped region has a doping concentration of at least $1 \times 10^{20}$ cm$^{-3}$ and no more than $2.5 \times 10^{20}$ cm$^{-3}$.

72. The optoelectronic device of any of clauses 67-71, further including an undoped region of the epitaxial crystalline cladding layer, the undoped region being located between the doped region and the slab portion.

73. The optoelectronic device of clauses 50-72, wherein the device further includes:
a thermal isolation cavity, located on an opposing side of the bottom cladding layer to the slab portion.

74. The optoelectronic device of clause 73, further including:
a buried oxide layer, disposed adjacent to a lower surface of the bottom cladding layer, wherein the thermal isolation cavity is located on an opposing side of the buried oxide layer and is adjacent to a silicon substrate.

75. The optoelectronic device of either clause 73 or 74, wherein the thermal isolation cavity has a width which is larger than a width of the slab portion.

76. The optoelectronic device of clauses 50-75, further comprising an electrode, electrically connected to either the ridge portion or the slab portion, wherein the electrode includes at least one thermal isolation cavity.

77. The optoelectronic device of clause 76, wherein the electrode comprises plural thermal isolation cavities in an array, wherein the array extends in a direction substantially parallel to the guiding direction of the rib waveguide.

78. The optoelectronic device of clause 77, wherein the array extends for a length of at least 50 μm and no more than 100 μm.

79. The optoelectronic device of any of clauses 76-78, wherein the electrode comprises at least 2 cavities and no more than 30 cavities.

80. The optoelectronic device of any of clauses 76-79, wherein the or each cavity in the electrode has a length of at least 2 μm and no more than 30 μm.

81. The optoelectronic device of any of clauses 76-80, wherein the or each cavity in the electrode has a width of at least 1 μm and no more than 10 μm.

82. The optoelectronic device of any of clauses 77-79, wherein a gap between adjacent cavities in the electrode has a length of at least 1 μm and no more than 20 μm.

83. The optoelectronic device of any of clauses 76-82, wherein the or each cavity in the electrode is filled with air or $SiO_2$.

84. An optoelectronic device, including:
a rib waveguide, the rib waveguide including:
a ridge portion, which includes a temperature-sensitive optically active region,
and a slab portion, positioned adjacent to the ridge portion;
wherein the device further comprises:
a heater, for heating the temperature-sensitive optically active region;
a bottom cladding layer, disposed adjacent to the slab portion; and
a thermal isolation cavity, located on an opposing side of the bottom cladding layer to the slab portion.

85. The optoelectronic device of clause 84, further including:
a buried oxide layer, disposed adjacent to a lower surface of the bottom cladding layer, wherein the thermal isolation cavity is located on an opposing side of the buried oxide layer and is adjacent to a silicon substrate.

86. The optoelectronic device of either clause 84 or 85, wherein the thermal isolation cavity has a width which is larger than a width of the slab portion.

87. The optoelectronic device of any of clauses 84-86, further including a thermal isolation trench, wherein the thermal isolation trench is positioned adjacent to the bottom cladding layer.

88. The optoelectronic device of clause 87, wherein the thermal isolation trench is filled with either air or silicon dioxide.

89. The optoelectronic device of either of clauses 87 or 88, wherein the thermal isolation trench has a width of at least 0.5 μm and no more than 2.0 μm.

90. The optoelectronic device of any of clauses 87-89, including plural thermal isolation trenches, which are arranged around a periphery of the slab portion.

91. The optoelectronic device of any of clauses 87-90, wherein the heater is disposed on top of the slab portion, and wherein a part of the heater closest to the ridge portion is at least 2 μm away from the ridge portion.

92. The optoelectronic device of clause 91, wherein a width of a first region of the heater tapers from a first width to a second width in a direction substantially parallel to a guiding direction of the rib waveguide.

93. The optoelectronic device of clause 92, wherein the width of a second region of the heater increases from the second width to the first width along the direction substantially parallel to the guiding direction of the rib waveguide.

94. The optoelectronic device of clause 91, wherein the heater comprises plural metal strips, connected at one end to an adjacent metal strip so as to form a serpentine form.

95. The optoelectronic device of clause 94, wherein the heater comprises at least 2 metal strips and no more than 20 metal strips.

96. The optoelectronic device of either clause 94 or 95, further including a first and second electrode for the heater, which are electrically connected to the heater on the same side.

97. The optoelectronic device of any of clauses 94-96, wherein each metal strip has a width of at least 0.5 μm and no more than 10 μm.

98. The optoelectronic device of any of clauses 94-97, wherein a gap between adjacent metal strips has a width of at least 0.5 μm and no more than 10 μm.

99. The optoelectronic device of any of clauses 94-98, wherein the heater is formed from any one of Ti, TiN, TiW, NiCr, or W.

100. The optoelectronic device of any of clauses 90-99, wherein the heater is disposed above an electrical contact for the slab portion and separated therefrom by an insulator.

101. The optoelectronic device of any of clauses 90-100, further including an upper cladding layer disposed on the heater.

102. The optoelectronic device of any of clauses 90-100, further including a second heater, substantially identical to the first and disposed on an opposing side of the ridge portion.

103. The optoelectronic device of any of clauses 84-89, wherein the heater is disposed in the bottom cladding layer which is an epitaxial crystalline cladding layer.

104. The optoelectronic device of clause 100, wherein the heater comprises a doped region of the epitaxial crystalline cladding layer.

105. The optoelectronic device of clause 104, wherein the doped region of the epitaxial crystalline cladding layer extends in a direction substantially parallel to the guiding direction of the rib waveguide.

106. The optoelectronic device of either clause 104 or 105, wherein the doped region has a width of at least 1 μm and no more than 30 μm.

107. The optoelectronic device of any of clauses 104-106, wherein the doped region has a height of at least 0.1 μm and no more than 0.3 μm.

108. The optoelectronic device of any of clauses 104-107, wherein the doped region has a doping concentration of at least $1 \times 10^{20}$ cm$^{-3}$ and no more than $2.5 \times 10^{20}$ cm$^{-3}$.

109. The optoelectronic device of any of clauses 104-108, further including an undoped region of the epitaxial crystalline cladding layer, the undoped region being located between the doped region and the slab portion.

110. The optoelectronic device of clauses 83-109, further comprising an electrode, electrically connected to either the ridge portion or the slab portion, wherein the electrode includes at least one thermal isolation cavity.

111. The optoelectronic device of clause 110, wherein the electrode comprises plural thermal isolation cavities in an array, wherein the array extends in a direction substantially parallel to the guiding direction of the rib waveguide.

112. The optoelectronic device of clause 111, wherein the array extends for a length of at least 50 μm and no more than 100 μm.

113. The optoelectronic device of any of clauses 110-112, wherein the electrode comprises at least 2 cavities and no more than 30 cavities.

114. The optoelectronic device of any of clauses 110-113, wherein the or each cavity in the electrode has a length of at least 2 μm and no more than 30 μm.

115. The optoelectronic device of any of clauses 110-114, wherein the or each cavity in the electrode has a width of at least 1 μm and no more than 10 μm.

116. The optoelectronic device of any of clauses 111-113, wherein a gap between adjacent cavities in the electrode has a length of at least 1 μm and no more than 20 μm.

117. The optoelectronic device of any of clauses 110-116, wherein the or each cavity in the electrode is filled with air or $SiO_2$.

118. An optoelectronic device, including:
a rib waveguide, the rib waveguide including:
  a ridge portion, which includes a temperature-sensitive optically active region,
  and a slab portion, positioned adjacent to the ridge portion;
wherein the device further comprises:
a heater, for heating the temperature-sensitive optically active region; and
an electrode, electrically connected to either the ridge portion or the slab portion, and a heater positioned between the electrode and the ridge portion;
wherein the electrode includes at least one thermal isolation cavity.

119. The optoelectronic device of clause 118, wherein the electrode comprises plural thermal isolation cavities in an array, wherein the array extends in a direction substantially parallel to the guiding direction of the rib waveguide.

120. The optoelectronic device of clause 119, wherein the array extends for a length of at least 50 μm and no more than 100 μm.

121 The optoelectronic device of any of clauses 118-120, wherein the electrode comprises at least 2 cavities and no more than 30 cavities.

122. The optoelectronic device of any of clauses 118-121, wherein the or each cavity in the electrode has a length of at least 2 μm and no more than 30 μm.

123. The optoelectronic device of any of clauses 118-122, wherein the or each cavity in the electrode has a width of at least 1 μm and no more than 10 μm.

124. The optoelectronic device of any of clauses 119-121, wherein a gap between adjacent cavities in the electrode has a length of at least 1 μm and no more than 20 μm.

125. The optoelectronic device of any of clauses 118-124, wherein the or each cavity in the electrode is filled with air or $SiO_2$.

126. The optoelectronic device of any of clauses 118-125, further including
a bottom cladding layer, disposed adjacent to the slab portion; and
a thermal isolation cavity, located on an opposing side of the bottom cladding layer to the slab portion.

127. The optoelectronic device of clause 126, further including:
a buried oxide layer, disposed adjacent to a lower surface of the bottom cladding layer, wherein the thermal isolation cavity is located on an opposing side of the buried oxide layer and is adjacent to a silicon substrate.

128. The optoelectronic device of either clause 126 or 127, wherein the thermal isolation cavity has a width which is larger than a width of the slab portion.

129. The optoelectronic device of any of clauses 126-128, further including a thermal isolation trench, wherein the thermal isolation trench is positioned adjacent to the bottom cladding layer.

130. The optoelectronic device of clause 129, wherein the thermal isolation trench is filled with either air or silicon dioxide.

131. The optoelectronic device of either of clauses 129 or 130, wherein the thermal isolation trench has a width of at least 0.5 μm and no more than 2.0 μm.

132. The optoelectronic device of any of clauses 129-131, including plural thermal isolation trenches, which are arranged around a periphery of the slab portion.

133. The optoelectronic device of any of clauses 118-132, wherein the heater is disposed on top of the slab portion, and wherein a part of the heater closest to the ridge portion is at least 2 μm away from the ridge portion.

134. The optoelectronic device of clause 133, wherein a width of a first region of the heater tapers from a first width to a second width in a direction substantially parallel to a guiding direction of the rib waveguide.

135. The optoelectronic device of clause 134, wherein the width of a second region of the heater increases from the second width to the first width along the direction substantially parallel to the guiding direction of the rib waveguide.

136. The optoelectronic device of clause 133, wherein the heater comprises plural metal strips, connected at one end to an adjacent metal strip so as to form a serpentine form.

137. The optoelectronic device of clause 136, wherein the heater comprises at least 2 metal strips and no more than 20 metal strips.

138. The optoelectronic device of either clause 136 or 137, further including a first and second electrode for the heater, which are electrically connected to the heater on the same side.

139. The optoelectronic device of any of clauses 136-138, wherein each metal strip has a width of at least 0.5 μm and no more than 10 μm.

140. The optoelectronic device of any of clauses 136-139, wherein a gap between adjacent metal strips has a width of at least 0.5 μm and no more than 10 μm.

141. The optoelectronic device of any of clauses 136-140, wherein the heater is formed from any one of Ti, TiN, TiW, NiCr, or W.

142. The optoelectronic device of any of clauses 133-141, wherein the heater is disposed above an electrical contact for the slab portion and separated therefrom by an insulator.

143. The optoelectronic device of any of clauses 133-143, further including an upper cladding layer disposed on the heater.

144. The optoelectronic device of any of clauses 133-144, further including a second heater, substantially identical to the first and disposed on an opposing side of the ridge portion.

145. The optoelectronic device of any of clauses 118-132, wherein the heater is disposed in the bottom cladding layer which is an epitaxial crystalline cladding layer.

146. The optoelectronic device of clause 145, wherein the heater comprises a doped region of the epitaxial crystalline cladding layer.

147. The optoelectronic device of clause 146, wherein the doped region of the epitaxial crystalline cladding layer extends in a direction substantially parallel to the guiding direction of the rib waveguide.

148. The optoelectronic device of either clause 146 or 147, wherein the doped region has a width of at least 1 μm and no more than 30 μm.

149. The optoelectronic device of any of clauses 146-148, wherein the doped region has a height of at least 0.1 μm and no more than 0.3 μm.

150. The optoelectronic device of any of clauses 146-149, wherein the doped region has a doping concentration of at least $1\times10^{20}$ cm$^{-3}$ and no more than $2.5\times10^{20}$ cm$^{-3}$.

151. The optoelectronic device of any of clauses 146-150, further including an undoped region of the epitaxial crystalline cladding layer, the undoped region being located between the doped region and the slab portion.

The invention claimed is:

1. An optoelectronic device, including:
a rib waveguide, the rib waveguide including:
   a ridge portion, which includes a temperature-sensitive optically active region, and
   a slab portion, positioned adjacent to the ridge portion;
wherein the optoelectronic device further comprises:
   a heater, for heating the temperature-sensitive optically active region;
   a bottom cladding layer, disposed adjacent to the slab portion; and
   a thermal isolation cavity, located on an opposing side of the bottom cladding layer to the slab portion, and
wherein a part of the heater closest to the ridge portion is at least 2 µm away from the ridge portion.

2. The optoelectronic device of claim 1, further including:
a buried oxide layer, disposed adjacent to a lower surface of the bottom cladding layer, wherein the thermal isolation cavity is located on an opposing side of the buried oxide layer and is adjacent to a silicon substrate.

3. The optoelectronic device of claim 1, wherein the thermal isolation cavity has a width which is larger than a width of the slab portion.

4. The optoelectronic device of claim 1, further including a thermal isolation trench, wherein the thermal isolation trench is positioned adjacent to the bottom cladding layer.

5. The optoelectronic device of claim 4, wherein the heater is disposed on top of the slab portion.

6. The optoelectronic device of claim 5, wherein a width of a first region of the heater tapers from a first width to a second width in a direction substantially parallel to a guiding direction of the rib waveguide.

7. The optoelectronic device of claim 6, wherein the width of a second region of the heater increases from the second width to the first width along the direction substantially parallel to the guiding direction of the rib waveguide.

8. The optoelectronic device of claim 5, wherein the heater comprises plural metal strips, connected at one end to an adjacent metal strip so as to form a serpentine form.

9. The optoelectronic device of claim 5, further including a first and second electrode for the heater, which are electrically connected to the heater on the same side.

10. The optoelectronic device of claim 8, wherein the heater is formed from any one of Ti, TiN, TiW, NiCr, or W.

11. The optoelectronic device of claim 4, wherein the heater is disposed above an electrical contact for the slab portion and separated therefrom by an insulator.

12. The optoelectronic device of claim 4, further including an upper cladding layer disposed on the heater.

13. The optoelectronic device of claim 4, wherein the heater is a first heater, the optoelectronic device further including a second heater, substantially identical to the first heater and disposed on an opposing side of the ridge portion.

14. An optoelectronic device, including:
a rib waveguide, the rib waveguide including:
   a ridge portion, which includes a temperature-sensitive optically active region, and
   a slab portion, positioned adjacent to the ridge portion;
wherein the optoelectronic device further comprises:
   a heater, for heating the temperature-sensitive optically active region;
   a bottom cladding layer, disposed adjacent to the slab portion;
   a thermal isolation cavity, located on an opposing side of the bottom cladding layer to the slab portion; and
   an electrode, electrically connected to either the ridge portion or the slab portion, wherein the electrode includes at least one thermal isolation cavity.

15. The optoelectronic device of claim 14, wherein the electrode comprises plural thermal isolation cavities in an array, wherein the array extends in a direction substantially parallel to the guiding direction of the rib waveguide.

16. The optoelectronic device of claim 15, wherein the or each cavity in the electrode is filled with air or SiO2.

17. An optoelectronic device, including:
a rib waveguide, the rib waveguide including:
   a ridge portion, which includes a temperature-sensitive optically active region, and
   a slab portion, positioned adjacent to the ridge portion;
wherein the optoelectronic device further comprises:
   a heater, for heating the temperature-sensitive optically active region;
   a bottom cladding layer, disposed adjacent to the slab portion; and
   a thermal isolation cavity, located on an opposing side of the bottom cladding layer to the slab portion, and
wherein the heater is disposed in the bottom cladding layer.

18. The optoelectronic device of claim 17, wherein the bottom cladding layer is an epitaxial crystalline cladding layer.

19. The optoelectronic device of claim 18, wherein the heater comprises a doped region of the epitaxial crystalline cladding layer.

20. The optoelectronic device of claim 19, wherein the doped region of the epitaxial crystalline cladding layer extends in a direction substantially parallel to the guiding direction of the rib waveguide.

21. The optoelectronic device of claim 19, further including an undoped region of the epitaxial crystalline cladding layer, the undoped region being located between the doped region and the slab portion.

\* \* \* \* \*